(12) United States Patent
Choi

(10) Patent No.: US 12,449,160 B2
(45) Date of Patent: Oct. 21, 2025

(54) METHOD OF MANUFACTURING HEAT EXCHANGER PIPE

(71) Applicant: Sung-Hwan Choi, Seoul (KR)

(72) Inventor: Sung-Hwan Choi, Seoul (KR)

(*) Notice: Subject to any disclaimer, the term of this patent is extended or adjusted under 35 U.S.C. 154(b) by 385 days.

(21) Appl. No.: 18/154,432

(22) Filed: Jan. 13, 2023

(65) Prior Publication Data
US 2023/0152005 A1 May 18, 2023

Related U.S. Application Data

(60) Division of application No. 16/858,098, filed on Apr. 24, 2020, now Pat. No. 12,163,695, which is a
(Continued)

(30) Foreign Application Priority Data

Jan. 19, 2012 (KR) .................. 10-2012-0005977

(51) Int. Cl.
*F28F 1/40* (2006.01)
*F24H 1/18* (2022.01)
(Continued)

(52) U.S. Cl.
CPC ........... *F24H 1/287* (2013.01); *F24H 9/0031* (2013.01); *F28D 7/1676* (2013.01); *F28F 1/40* (2013.01); *F24H 1/186* (2013.01)

(58) Field of Classification Search
CPC ........ F24H 1/287; F24H 9/0031; F24H 1/186; F28D 7/1676; F28D 7/1669; F28F 1/40; F28F 2255/16; F28F 2215/10
See application file for complete search history.

(56) References Cited

U.S. PATENT DOCUMENTS 3,662,582 A 5/1972 French
4,260,181 A 4/1981 Curtin
(Continued)

FOREIGN PATENT DOCUMENTS

KR 100724601 B1 5/2007
KR 100747000 B1 8/2007
(Continued)

OTHER PUBLICATIONS

International Search Report issued in PCT/KR2012/007404; mailed Dec. 28, 2012.
(Continued)

*Primary Examiner* — Lee A Holly
(74) *Attorney, Agent, or Firm* — Studebaker Brackett PLLC

(57) ABSTRACT

The present invention relates to a heat exchanger pipe enabling heat exchange between fluid flowing through the pipe and fluid existing outside the pipe, and a method of manufacturing the heat exchanger pipe. In particular, the present invention relates to a heat exchanger pipe that improves a heat exchange rate by making flow of fluid through the pipe more active and increasing a contact amount, that has an improved contact characteristic and a sealing characteristic between an outer pipe and an insert inserted in the outer pipe in the process of manufacturing, and that is easily manufactured; and a method of manufacturing the heat exchanger pipe.

1 Claim, 17 Drawing Sheets

Related U.S. Application Data continuation-in-part of application No. 14/373,383, filed as application No. PCT/KR2012/007404 on Sep. 17, 2012, now abandoned.

(51) Int. Cl.
*F24H 1/28* (2022.01)
*F24H 9/00* (2022.01)
*F28D 7/16* (2006.01)

(56) References Cited

U.S. PATENT DOCUMENTS

| | | | |
|---|---|---|---|
| 4,657,074 A | | 4/1987 | Tomita et al. |
| 5,027,749 A | | 7/1991 | Cifaldi |
| 6,070,657 A | * | 6/2000 | Kunkel ............... F28F 1/40 |
| | | | 165/158 |
| 7,073,570 B2 | * | 7/2006 | Yu ..................... F28F 3/044 |
| | | | 165/177 |
| 2005/0145380 A1 | | 7/2005 | Usui |
| 2008/0185130 A1 | * | 8/2008 | Fang ................. F28D 1/05383 |
| | | | 165/177 |
| 2012/0080172 A1 | | 4/2012 | Pacholski |
| 2014/0131021 A1 | * | 5/2014 | Choi ................. B21C 37/225 |
| | | | 165/177 |
| 2015/0267970 A1 | | 9/2015 | Home et al. |
| 2018/0202724 A1 | | 7/2018 | Lin |

FOREIGN PATENT DOCUMENTS

| | | |
|---|---|---|
| KR | 10-2009-0063438 A | 6/2009 |
| KR | 10-2009-0103412 A | 10/2009 |
| KR | 10-2011-0083195 A | 7/2011 |
| KR | 10-2011-0135438 A | 12/2011 |

OTHER PUBLICATIONS

International Preliminary Report On Patentability and Written Opinion issued in PCT/KR2012/007404; issued Jul. 22, 2014.

* cited by examiner

METHOD OF MANUFACTURING HEAT EXCHANGER PIPE

CROSS-REFERENCE TO RELATED APPLICATIONS

This application is a Divisional of U.S. patent application Ser. No. 16/858,098, filed on Apr. 24, 2020, which is a continuation-in-part of U.S. patent application Ser. No. 14/373,383, filed on Jul. 21, 2014, which is a National Stage Entry of International Patent Application No. PCT/KR2012/007404, filed on Sep. 17, 2012, which claims the benefit of priority to Korean Patent Application No. 10-2012-0005977, filed on Jan. 19, 2012. The disclosures of the above-listed applications are hereby incorporated by reference herein in their entirety.

BACKGROUND OF THE INVENTION

Field of the Invention

The present invention relates to a heat exchanger and, more particularly, to a heat exchanger that enables heat exchange between fluid flowing through a pipe and fluid existing outside the fluid, and a method of manufacturing the heat exchanger.

Description of the Related Art

In general, a heat exchanger pipe is used for various heating/cooling systems such as a boiler, a heat pump, and an air conditioner and provides not only hot water or heating water, but also hot air and cold air by enabling heat exchange between fluid flowing through the pipe and fluid existing outside the pipe. The fluid flowing through the pipe is gas such as high-temperature combustion gas and the fluid existing outside the pipe is liquid such as raw water. In this case, the high-temperature combustion gas usually exchanges heat with the raw water while flowing through the heat exchanger pipe, thereby providing hot water or heating water, but the fluids existing inside and outside the pipe is not specifically limited and may be liquid or gas.

Meanwhile, a 'heat exchanger tube for heating boilers' of Korean Patent No. 10-217265, as shown in FIG. 1, includes a cylindrical outer tube 1001 and a pair of half shells 1003 and 1004 disposed in the outer tube 1001 in contact with the outer tube 1001. A plurality of ribs 1005 is disposed in a comb shape in the half shells 1003 and 1004, thereby increasing the inner surface area. Further, a groove-shaped recess 1007 and a rib-shaped protrusion 1008 that are fitted to each other are formed on the contact-directional edges of the half shells 1003 to increasing the sealing force.

However, according to this related art, the lengths of the ribs 1005 are adjusted such that their ends are aligned, so the fluid flowing through the tube makes monotonous flow, and accordingly, there is a problem that the thermal contact amount between the fluid, which is a heat source, and the ribs 1005 is not sufficient. Further, the outer tube 1001 and the half shells 1003 and 1004 are assembled in close contact with each other by uniformly pressing the entire outer circumferential surface of the outer tube 1001. In this case, the actually applied force acts perpendicularly to the outer circumferential surface of the outer tube 1001, but the direction of force Fn required to strongly bring the groove-shaped recesses 1007 and the rib-shaped protrusions 1008 in close contact with each other does not coincide with the direction of the actually applied force, so there is a problem that a gap is formed between the groove-shaped recesses 1007 and the rib-shaped protrusions 1008.

Further, since the two half shells 1003 and 1004 are provided as completely separate parts, it is required to separately form the half shells, and then fit them and assemble them in the outer tube 1001 in the manufacturing process. That is, the two half shells 1003 and 1004, which are completely separated at the groove-shaped recesses 1007 and the rib-shaped protrusions 1008, are independently formed through extrusion and then need to be combined to face each other and then assembled with the outer tube 1001. Accordingly, since it is required not only to extrude the two half shells 1003 and 1004, but also to cut the formed two half shells 1003 and 1004 into predetermined lengths, there is a problem that productivity of the half shells is poor. Further, the two half shells 1003 and 1004 are separately formed and the assembled in the outer tube 1001, in which it is very difficult to keep the half shells 1003 and 1004 aligned with each other, so there is a problem that productivity of a heat exchange tube is also poor. Further, since the two half shells 1003 and 1004 are completely separately provided, there is a possibility of leakage through the joints at both sides. When sealing is poor, there is a possibility of leakage of condensate water with condensation of high-temperature combustion gas. According to the related art, since there are provided the groove-shaped recesses 1007 and the rib-shaped protrusions 1008, they are fitted to each other and sealing is somewhat improved, but even in this case, there is a possibility of leakage through the gaps at both sides.

On the other hand, a hot water storage type boiler always keeps raw water at an appropriate temperature using a storage type heat exchanger disposed in a hot water tank, so there is the advantage that it is possible to immediately use hot water or heating water and supply a sufficient amount of water in comparison to an instantaneous type.

For example, a hot water storage type heat exchanger including a top end plate having multiple steps 2121*a*, 2121*b*, and 2121*c*, a bottom end plate 2122 having multiple steps 2122*a*, 2122*b*, and 2122*c*, and smoke tubes 2130 disposed between the laminas, as shown in FIG. 2, has been disclosed in Korean Patent No. 2013-0085090. Accordingly, when high-temperature combustion gas produced by a burner 2151 of a combustor 2150 is discharged through an exhaust port 2140 after passing through the smoke tubes 2130, low-temperature raw water in a water tank 2110 is heated by the smoke tubes 2130 that function as heat exchanger pipes.

However, in the related art shown in FIG. 3, the smoke tubes 2130 disposed on steps are all circular tubes having a circular cross-section. Accordingly, many smoke tubes 2130 are required to increase the heat transfer area, which increase the outer diameter of the entire hot water storage type heat exchanger.

SUMMARY OF THE INVENTION

In order to solve the problems in the related art, an objective of the present invention is to provide a heat exchanger pipe that improves a heat exchange rate by making flow of fluid through the pipe more active and increasing a contact amount when enabling heat exchange between fluid flowing through the pipe and fluid existing outside the pipe, that has an improved contact characteristic and a sealing characteristic between an outer pipe and an insert inserted in the outer pipe in the process of manufacturing, and that is easily manufactured; and a method of manufacturing the heat exchanger pipe.

Another objective of the present invention is to provide a heat exchanger fin formed by integrally connecting two half shells to improve productivity by integrally forming the two half shells such that first ends of both ends of the half shells are connected, and a heat exchanger pipe having the heat exchanger fin.

Another objective of the present invention is to provide a heat exchanger fin formed by integrally connecting two half shells to be able to completely prevent leakage of condensate water through at least a joint because first ends of the two half shells are integrally formed.

Another objective of the present invention is to provide an elliptical exchanger pipe that can increase a heat transfer area in comparison to heat exchanger pipes having the same outer pipe size and another shape by having an elliptical cross-section and that prevents coming-off when a heat exchanger fin is inserted into an outer pipe.

Another objective of the present invention is to provide an elliptical heat exchanger pipe that is prevented from deforming and increases a heat exchange rate by configuring some of heat exchanger fins therein in a discontinuous type and configuring the other in a continuous type.

Another objective of the present invention is to provide a hot water storage type heat exchanger having an elliptical heat exchanger pipe in which a heat transfer area to the diameter of the entire heat exchanger is increased by arranging an elliptical heat exchanger pipe and a circular heat exchanger pipe in combination in a heat exchanger body.

In order to achieve the objectives, a heat exchanger pipe according to the present invention includes: an outer pipe formed in a cylindrical shape; a first half shell and a second half shell each have a semi-cylinder shape having outer circumferential surface being in contact with an inner circumferential surface of the outer pipe when combined to face each other in the outer pipe; and a first rib and a second rib extending internal space from inner circumferential surfaces of the first half shell and the second half shell, respectively, and disposed perpendicular to a virtual interface separating the first half shell and the second half shell, in which the first rib is provided as a plurality of pieces and lengths of the first ribs are adjusted such that an S-shape is formed when ends of the first ribs are sequentially connected by a virtual line; the second rib is provided as a plurality of pieces and lengths of the second ribs are adjusted such that an S-shape is formed when ends of the second ribs are sequentially connected by a virtual line; and the ends of the first ribs and the ends of the second ribs are spaced apart from each other.

A first half insert composed of the first half shell and the first ribs and a second half insert composed of the second half shell and the second ribs may be formed in the same shapes by extrusion, and the first half insert and the second half insert may be assembled such that a cross-sectional shape is symmetric left and right.

Both ends of the first half shell and both ends of the second half shell may be formed in flat shapes; and first bending portions bending toward the outer pipe may be formed with a predetermined length from the ends of the first half shell, second bending portions bending toward the outer pipe may be formed with a predetermined length from the ends of the second half shell, and when the first half shell and the second half shell are inserted in the outer pipe to face each other and then the outer pipe is pressed, the first bending portions and the second bending portions may be unfolded and the flat ends of the first half shell and the flat ends of the second half shell may be connected in close contact with each other.

A plurality of first prominences and recessions may be formed on the ends of the first half shell and a plurality of second prominences and recessions may be formed on the ends of the second half shell, so the first prominences and recessions and the second prominences and recessions may be fitted in close contact with each other when the outer pipe is pressed for assembly.

A heat exchange groove for increasing a surface area may be formed on a surface of the outer pipe.

A locking protrusion protruding inward may be formed at each of portions corresponding to both longitudinal ends of the first half shell and the second half shell on the outer pipe, thereby preventing separation of the first half shell and the second half shell from the outer pipe.

A method of manufacturing the heat exchanger pipe according to the present invention includes: an insert preparation process of placing the first half shell and the second half shell on ends on an upper bed having the same diameter as the first half shell and the second half shell combined to face each other; an outer pipe preparation process of placing the outer pipe on end on a lower bed having a larger diameter than the upper bed and supporting a bottom of the upper bed such that the first half shell and the second half shell are inserted in the outer pipe; a pressing-preparation process of disposing a dice mold having a tapered portion at a lower portion therein and having a pressing portion over the tapered portion therein-a diameter of a lower end of the tapered portion is the same as an outer diameter of the outer pipe and a diameter of the pressing portion is the same as a diameter of an assembly of the first half shell and the second half shell-over the outer pipe; and a pressing process of pressing the outer pipe with the pressing portion such that the inner circumferential surface of the outer pipe comes in close contact with the outer circumferential surfaces of the first half shell and the second half shell by moving down the dice mold such that the outer pipe is fitted in the dice mold and then by further moving down the dice mold.

A heat exchange fin formed by integrating two half shells according to the present invention includes: a first half shell formed in a semi-cylinder shape; a first rib extending toward an inner space from an inner circumferential surface of the first half shell; a second half shell formed in a semi-cylinder shape, forming a cylindrical shape through which fluid flow when combined with the first half shell to face each other, and having a circumferential end integrally connected to the first half shell; and a second rib extending toward an inner space from an inner circumferential surface of the second half shell.

The first rib may be provided as a plurality of pieces and lengths of the first ribs may be adjusted such that an S-shape is formed when ends of the first ribs are sequentially connected by a virtual line; the second rib may be provided as a plurality of pieces and lengths of the second ribs may be adjusted such that an S-shape is formed when ends of the second ribs are sequentially connected by a virtual line; and the ends of the first ribs and the ends of the second ribs may be spaced apart from each other. First prominences and recessions may be formed at an end of the first half shell where the first half shell and the second half shell are not integrally connected, second prominences and recessions may be formed at an end of the second half shell where the first half shell and the second half shell are not integrally connected, and the first prominences and recessions and the second prominences and recessions may be fitted in close contact each other.

The first half shell and the second half shell may be integrally connected through a bridge, and a bending groove guiding the first half shell and the second half shell such that the first half shell and the second half shell are closed may be formed at the bridge.

A heat exchanger pipe according to the present invention has the heat exchanger fin described above and a cylindrical outer pipe, in which the cylindrical heat exchanger fin is assembled in contact with an inner circumferential surface of the outer pipe. A locking protrusion protruding inward may be formed at each of portions corresponding to both longitudinal ends of the heat exchanger fin on the outer pipe, thereby preventing separation of the heat exchanger fin from the outer pipe.

An elliptical heat exchanger pipe according to the present invention includes: a pipe-shaped heat exchanger tube having an elliptical cross-section and having a hollow portion for flow of a heat source; and a plurality of heat exchanger fins protruding from an inner circumferential surface of the heat exchanger tube.

The heat exchanger fins may be disposed on a line extending from a side to the other side of the inner circumferential surface of the heat exchanger tube and may be spaced in the direction of the apsidal line of the heat exchanger tube; some of heat exchanger fins may be discontinuous type heat exchanger fins that are disconnected at middle portions in a longitudinal direction thereof and the others except for the discontinuous type heat exchanger fins may be continuous type heat exchanger fins that are entirely continuous in a longitudinal direction thereof.

A continuous fin group in which one or more continuous type heat exchanger fins are continuously disposed may be included in the heat exchanger fins.

One or more continuous fin groups may be provided and the continuous fin groups may be disposed between sections composed of the discontinuous type heat exchanger fins.

Lengths of ends of the discontinuous type heat exchanger fins in a section divided by the continuous fin group may be adjusted such that an S-shape is formed when ends thereof are sequentially connected by a virtual line.

A hot water storage type heat exchanger according to the present invention includes: a top end plate having a first top stage disposed at a center of a disc and a second top stage disposed around the first top stage; a bottom end plate having a first bottom stage disposed at a center of a disc and a second bottom stage disposed around the first bottom stage; a plurality of circular heat exchanger pipe having upper ends passing through the first top stage, having lower ends passing through the first bottom stage, and having a circular cross-section; and the elliptical heat exchanger pipes having upper ends passing through the second top stage and lower end passing through the second bottom stage.

The elliptical heat exchanger pipes may be circumferentially arranged along the second top stage and the second bottom stage.

According to the heat exchanger pipe of the present invention described above, since the lengths of the ribs are adjusted such that the ends of the ribs of the first half shell and the second half shell form S-shapes, the heat exchanger pipe improves a heat exchange rate by making flow of fluid through the pipe more active and increasing a contact amount.

Further, according to the method of manufacturing the heat exchanger pipe, since there are bending portions that are bent in the same direction as an actually applied force when the outer pipe is pressed, it is possible to improve a contact characteristic and a sealing characteristic between the outer pipe and an insert. Further, the outer pipe and the insert are brought in close contact with each other only by fitting and pushing down a dice mold, so manufacturing becomes easy.

Further, an end of the first half shell and an end of the second half shell are integrally connected. Accordingly, productivity of not only the heat exchanger fin, but also the heat exchanger pipe is improved.

Further, since ends are integrally formed, sealing is secured at the portion. Accordingly, leakage of condensate water through at least the ends is completely prevented.

Further, the elliptical heat exchanger pipe provides a heat exchanger pipe having an elliptical cross-section. Accordingly, a heat transfer area is increased in comparison to heat exchanger pipes having the same size of outer pipe and different shapes. Further, separation between the outer pipe and the heat exchanger fin is prevented when the heat exchanger fin is inserted into the outer pipe to be in close contact therewith.

Further, some of the heat exchanger fins of the elliptical heat exchanger are discontinuous type heat exchanger fins and the others are continuous type heat exchanger fins without disconnection, thereby providing a complex configuration.

Accordingly, the heat exchange rate is increased by the discontinuous type heat exchanger fins and deformation of the heat exchanger tube is fundamentally prevented by the reinforcing force provided by the continuous type heat exchanger fins, so it is not required to improve the processes or add processes in order to prevent deformation, thereby improving productivity.

Meanwhile, in the hot water storage type heat exchanger of the present invention, elliptical heat exchanger pipes having a large heat transfer area is disposed at the outer portion in the end plate having a large circumference and the circular heat exchanger pipes having a small heat transfer area are disposed at the center of the end plate having a small circumference, thereby providing a complex array of heat exchanger pipes. Accordingly, it is possible to considerably increase the heat transfer area by the heat exchanger pipe to the outer diameter of the entire heat exchanger and a relatively small number of heat exchanger pipes are used to provide the same thermal efficiency, so it is possible to reduce the size of the heat exchanger.

DETAILED DESCRIPTION OF THE INVENTION

Hereafter, a heat exchanger pipe according to embodiments of the present invention and a method of manufacturing the heat exchanger pipe are described in detail with reference to the accompanying drawings.

Figure 4:
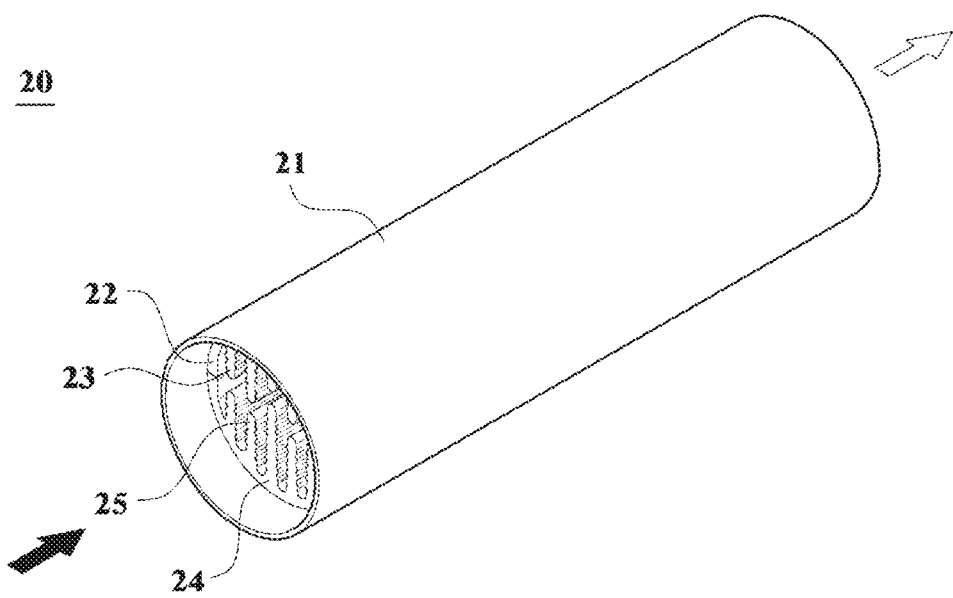
FIG. 4 is a perspective view showing a heat exchanger pipe according to a first embodiment of the present invention.
Figure 5:
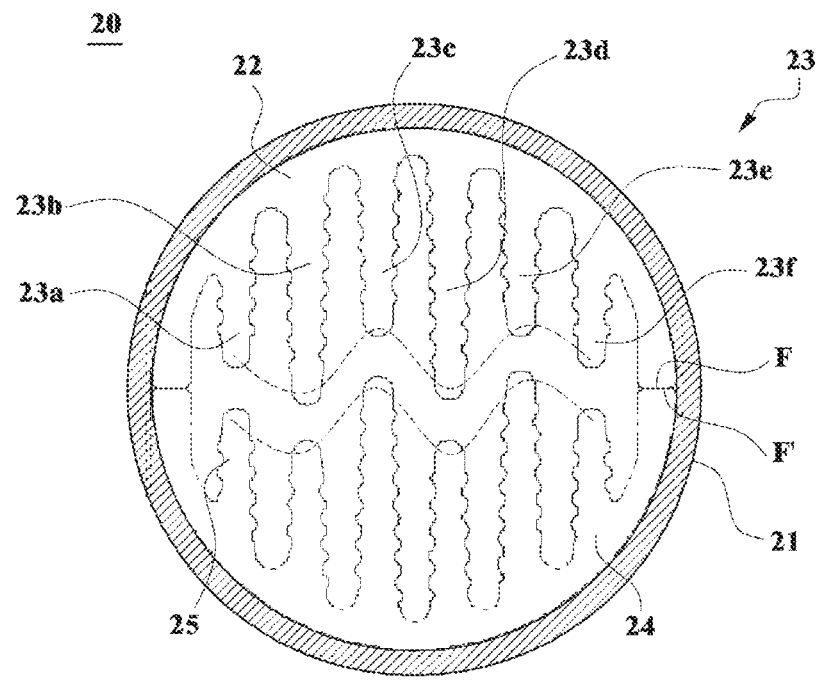
FIG. 5 is a cross-sectional view showing the heat exchanger pipe according to a first embodiment of the present invention.

FIG. 4 is a perspective view showing a heat exchanger pipe according to a first embodiment of the present invention and FIG. 5 is a cross-sectional view showing the heat exchanger pipe according to a first embodiment of the present invention.

First, a heat exchanger pipe 20 according to a first embodiment of the present invention, as shown in the perspective view of FIG. 4 and the cross-sectional view of FIG. 5, includes an outer pipe 21 formed in a cylindrical shape, a first half insert 22, 23 and a second half insert 24, 25 that are inserted in the outer pipe 21. For example, the outer pipe 21 may be made of a metal material such as steel, and the first half insert 22, 23 and the second half insert 24, 24 may be made of an aluminum material.

The first half insert 22, 23 is composed of a first half shell 22 formed in a semi-cylinder shape obtained by longitudinally cutting a cylinder, and a plurality of first ribs 23 disposed in the first half shell 22 and having long fin shapes.

Similarly, the second half insert 24, 25 is composed of a second half shell 24 and a plurality of second ribs 25.

Ends F of the first half shell 22 and ends F' of the second half shell 24 are flat surfaces, so when the first half shell 22 and the second half shell 24 are disposed to face each other and assembled such that the ends are strongly brought in surface contact with each other, fluid flowing through the first half shell 22 and the second half shell 24 is prevented from leaking through gaps between the first half shell 22 and the second half shell 24.

The first ribs 23 spaced a predetermined gap from each other extend toward the inner space from the inner circumferential surface of the first half shell 22 and the second ribs 25 spaced a predetermined gap from each other extend toward the inner space from the inner circumferential surface of the second half shell 24. The first ribs 23 and the second ribs 25 are arranged perpendicular to a virtual interface that separates the first half shell 22 and the second half shell 24.

In particular, the lengths of the first ribs 23 and the second ribs 25 are adjusted to each make an S-shape when the ends of the first ribs 23 and the ends of the second ribs 25 are sequentially connected by virtual lines, respectively, and the facing ends of the first ribs 23 and the second ribs 25 are spaced not to be in contact with each other.

For example, the first ribs 23 include first-first rib 23a to sixth-first rib 23f sequentially from the left in the figure, in which the second-second rib 25b is longer than the first-first rib 23a and the third-first rib 23c is shorter than the second-first rib 23b.

Further, the fourth-first rib 23d is longer than the third-first rib 23c, the fifth-first rib 23e is shorter than the fourth-first rib 23d, and the sixth-first rib 23f is shorter than the fifth-first rib 23e, that is, the lengths of the ribs are adjusted in this way.

Therefore, when the ends from the first-first rib 23a to the sixth-first rib 23f are sequentially connected by a virtual line, two S-shapes overlapping each other appear (indicated by dotted lines in FIG. 5).

The second ribs 25 also include six ribs, similar to the first ribs 23, in which when the ends from the first- to sixth-second ribs 25 are sequentially connected, two S-shapes overlapping each other appears. The first ribs 23 and the second ribs 25 are spaced not to be in contact with each other.

Accordingly, as compared with a heat exchanger tube of the related art in which flow of fluid in the tube is monotonous because the ends of ribs (see 1005 in FIG. 5) are aligned to form a comb shape, the present invention further have an S-shaped passage, so the fluid flowing through the first half shell 22 and the second half shell 24 fluctuates much, whereby the thermal contact amount between the fluid and the first ribs 23 or the second ribs 25 increases.

Further, the thermal contact amount of fluid, which is a heat source such as high-temperature combustion gas, with the first ribs 23 or the second ribs 25 increases, the amount of heat transferring to the outer pipe 21 being in contact with the first half shell 22 and the second half shell 24 also increases, whereby it is possible to increase the heat exchange efficiency with raw water, etc. outside the outer pipe 21 can be increased.

However, the first half insert 22, 23 is formed by integrally extruding the first half shell 22 and the first rib 23 and the second half insert 24, 25 is formed by integrally extruding the second half shell 24 and the second ribs 25, and in this case, if the same mold is used regardless of the first half insert 22, 23 and the second half insert 24, 25, it would be possible to reduce the manufacturing cost.

Obviously, in this case, the first half insert 22, 23 and the second half insert 24, 25 should be assembled such that the cross-sectional shapes are symmetric left and right.

Hereafter, a heat exchanger pipe according to a second embodiment of the present invention is described with reference to the accompanying drawings.

Figure 6:
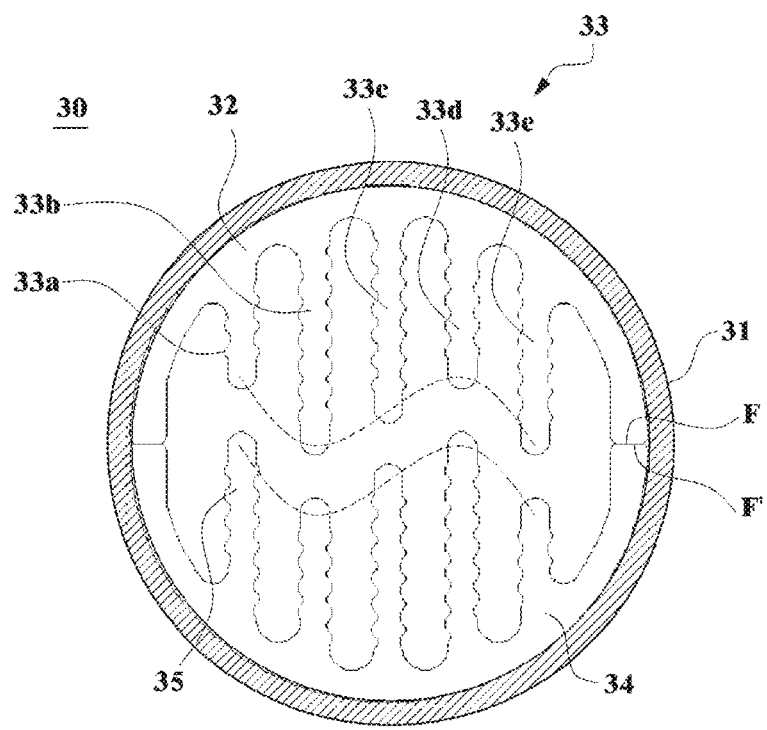
FIG. 6 is a cross-sectional view showing a heat exchanger pipe according to a second embodiment of the present invention.

FIG. 6 is a cross-sectional view showing a heat exchanger pipe according to a second embodiment of the present invention.

As shown in FIG. 6, a heat exchanger pipe 30 according to a second embodiment of the present invention includes an outer pipe 31 formed in a cylindrical shape, and a first half insert 32, 33 and a second half insert 34, 35 that are inserted in the outer pipe 31.

The first half insert 32, 33 is composed of a first half shell 32 and a plurality of first ribs 33 and the second half insert 34, 35 is composed of a second half shell 34 and a plurality of second ribs 35. This configuration is the same as that of the first embodiment of the present invention described above.

However, in the heat exchanger pipe according to the second embodiment of the present invention, the first ribs 33 include a first-first rib 33a to a fifth-first rib 33e sequentially from the left in the figure and the second ribs 35 also include five ribs. When the ends of the five first ribs 33 are sequentially connected by a virtual line, one S-shape is obtained and, similarly, another S-shape is obtained from the second ribs 35.

That is, the ribs of the first embodiment of the present invention described with reference to FIG. 5 each include six ribs (see 23 and 25 in FIG. 5), while the ribs of the second embodiment of the present invention each include five ribs 33 and 35, that is, the numbers of ribs are different, so the S-shapes may be slightly changed, but the present invention can increase the heat exchange rate by increasing flow of fluid.

Hereafter, a heat exchanger pipe according to a third embodiment of the present invention is described with reference to the accompanying drawings. However, the third embodiment of the present invention is fundamentally based on the first embodiment of the present invention, so only different configurations are shown and described.

Figure 7A:
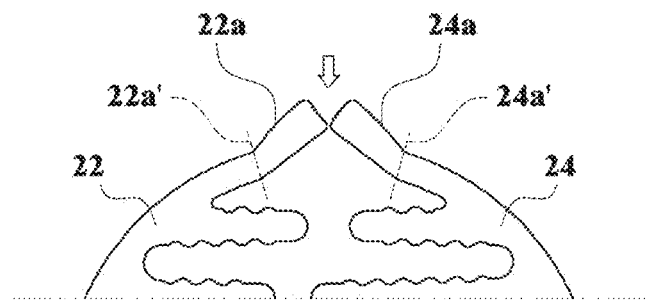
FIGS. 7A and 7B are cross-sectional views showing a heat exchanger pipe according to a third embodiment of the present invention.
Figure 7B:
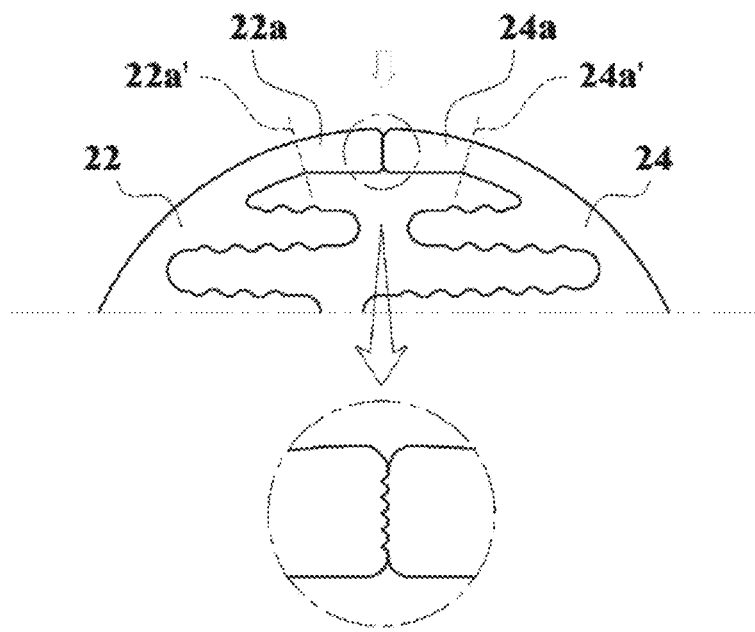

FIGS. 7A and 7B are cross-sectional views showing a heat exchanger pipe according to a third embodiment of the present invention.

Figure 2:
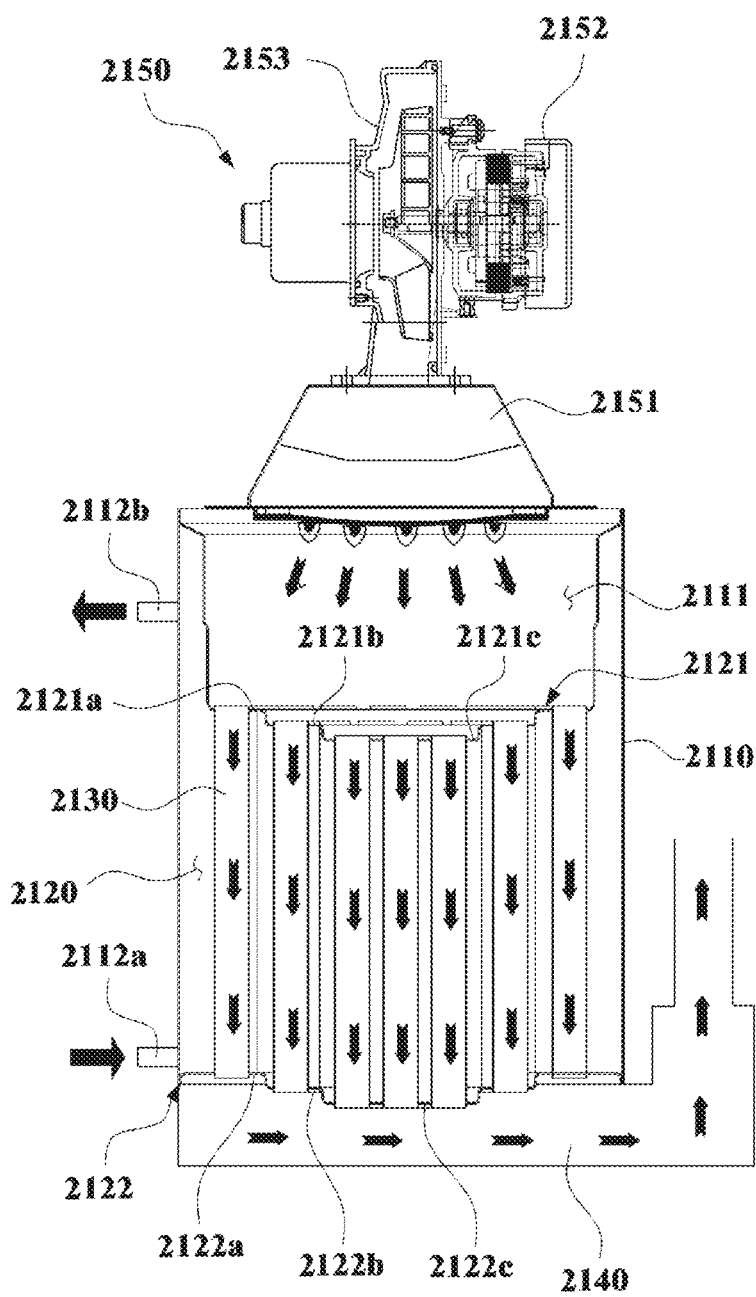
FIG. 2 is a front cross-sectional view showing a hot water storage type boiler according to the related art.

As shown in FIGS. 7A and 7B, a heat exchanger pipe according to a third embodiment of the present invention includes a first half insert 22, 23 and a second half insert 24, 25 that are inserted in an outer pipe (see 21 in FIG. 2) formed in a cylindrical shape. The first half insert 22, 23 is composed of a first half shell 22 and a plurality of first ribs 23 and the second half insert 24, 25 is composed of a second half shell 24 and a plurality of second ribs 25. This configuration is the same as that of the first embodiment of the present invention described above.

However, the third embodiment of the present invention has a different in that first bending portions 22a and second bending portions 24a for assembly are respectively formed at both end portions of the first half shell 22 and at both end portions of the second half shell 24, and the first bending portions 22a and the second bending portions 24a are bent outward respectively from first bending surfaces 22a' and second bending surfaces 24a'.

That is, both ends of the first half shell 22 and both ends of the second half shell 24 are formed in flat shapes, in which, as shown in FIG. 7A, the first bending portions 22a bending toward the outer pipe 31 are formed with a predetermined length from the flat ends of the first half shell 22 and the second bending portions 24a bending toward the outer pipe 31 are formed with a predetermined length from the flat ends of the second half shell 24.

Accordingly, as shown in FIG. 7B, when the outer pipe 21 is pressed and compressed to come in close contact with the outer circumferential surfaces of the first half shell 22 and the second half shell 24 in the assembling process, the first bending portions 22a and the second bending portion 24a are pressed and unfolded inward and the flat ends of the first half shell 22 and the flat ends of the second half shell 24 are slightly pressed and deformed, whereby the ends are strongly brought in surface contact with each other.

Therefore, it is possible to solve the problem in the related art that the force that is actually applied for assembly acts perpendicular to the outer circumferential surface of the outer tube 1001 in the related art but the force for strongly bring the groove-shaped recesses 1007 and the rib-shaped protrusions 1008 in close contact with is not actually applied in the direction of the above force, thereby causing gaps between the groove-shaped recesses 1007 and the rib-shaped protrusions 1008.

Figure 8:
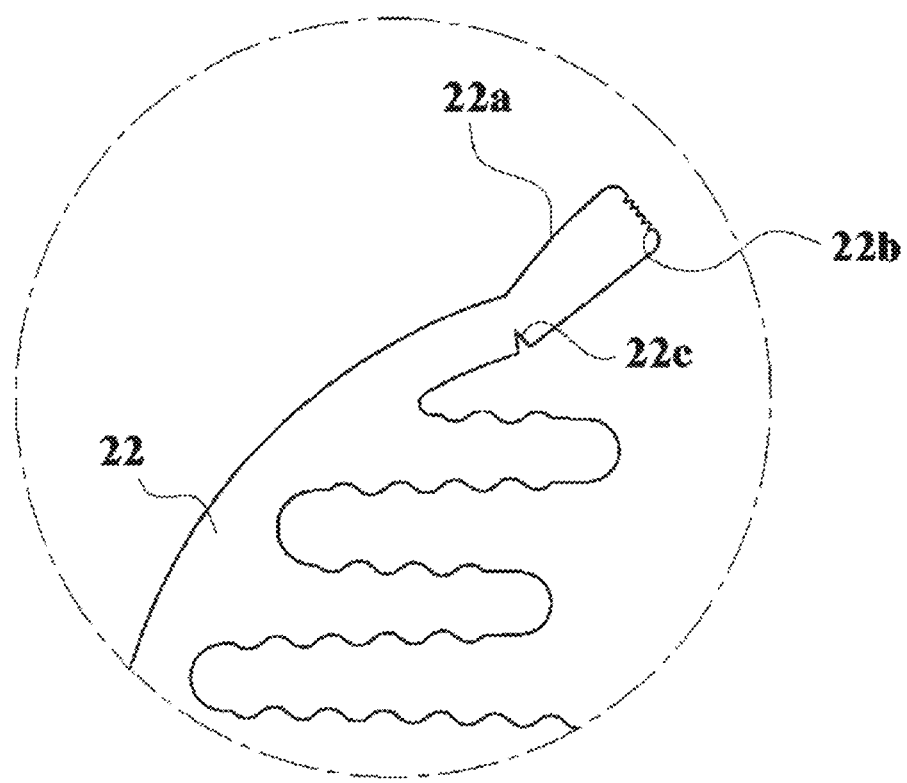
FIG. 8 is a partial cross-sectional view showing a heat exchanger pipe according to a fourth embodiment of the present invention.

FIG. 8 is a partial cross-sectional view showing a heat exchanger pipe according to a fourth embodiment of the present invention.

Referring to FIG. 8, in a fourth embodiment of the present invention, a plurality of first prominences and recessions 22b is formed on flat ends of the first half shell 22 and a plurality of second prominences and recessions (not shown) is formed on flat ends of the second half shell 24, so the first prominences and recessions 22b and the second prominences and recessions are fitted to each other when the entire outer pipe 21 is uniformly pressed for assembly, thereby being able to further increase the sealing force.

Obviously, a cut groove 22c is formed on the bending surfaces of the first bending portions 22a and the bending surfaces of the second bending portions 24a, so when the entire outer pipe 21 is pressed for assembly, the first bending portions 22a and the second bending portions 24a are guided to be unfolded, whereby assembly can be achieved more easily.

Hereafter, a heat exchanger pipe according to a fifth embodiment of the present invention is described with reference to the accompanying drawings.

Figure 9:
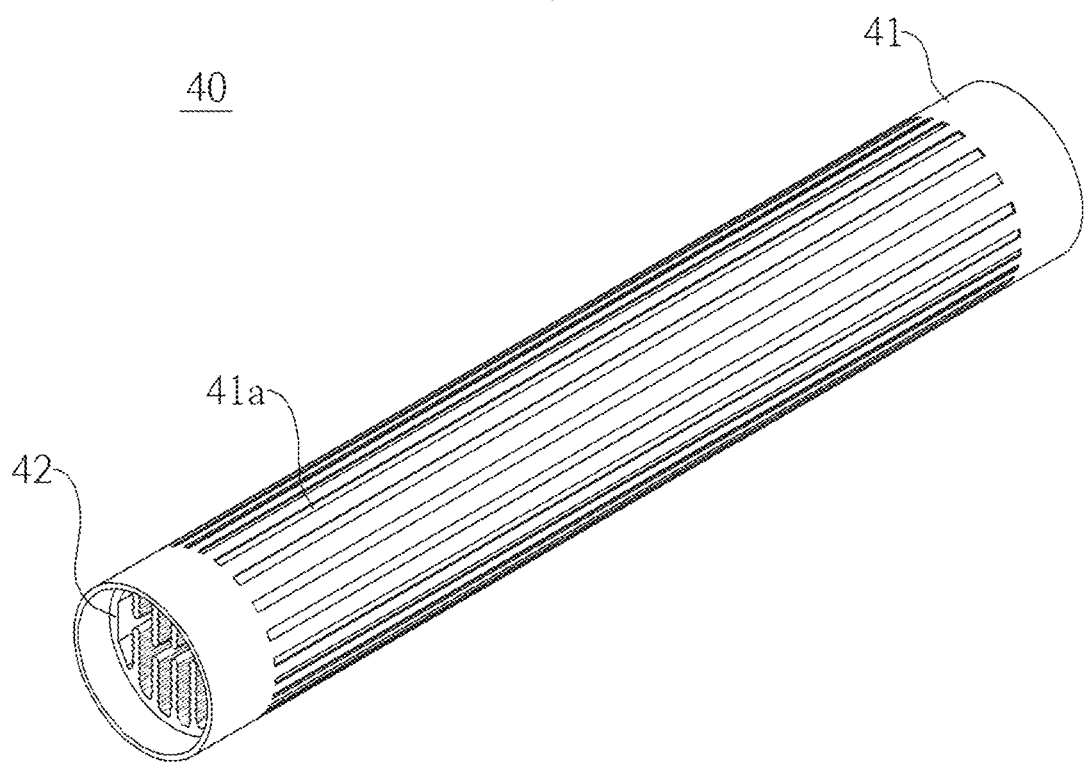
FIG. 9 is a perspective view showing a heat exchanger pipe according to a fourth embodiment of the present invention.

FIG. 9 is a perspective view showing a heat exchanger pipe according to a fourth embodiment of the present invention.

As shown in FIG. 9, a heat exchanger pipe according to a fifth embodiment of the present invention includes an outer pipe 41, and, as described above, an insert 42 composed of a first half insert and a second half insert. This configuration is the same as the above description.

However, in the fifth embodiment of the present invention, heat exchange grooves 41a for increase the surface area is formed on the surface of the outer pipe 41, so the heat of fluid (i.e., high-temperature combustion gas, etc.) flowing through the outer pipe 41 can more efficiently transfer to fluid (i.e., raw water, etc.) existing outside the outer pipe 41.

However, it is exemplified that a plurality of heat exchange grooves is longitudinally formed on the outer pipe 41 and arranged around the outer pipe 41 in FIG. 9, but the heat exchange grooves circularly arranged around the outer pipe 41 may be longitudinally arranged with predetermined gaps on the outer pipe 41 or may be spirally formed on the outer circumferential surface of the outer pipe, and other various patterns may be possible.

Hereafter, a heat exchanger pipe according to a sixth embodiment of the present invention is described with reference to the accompanying drawings.

Figure 10:
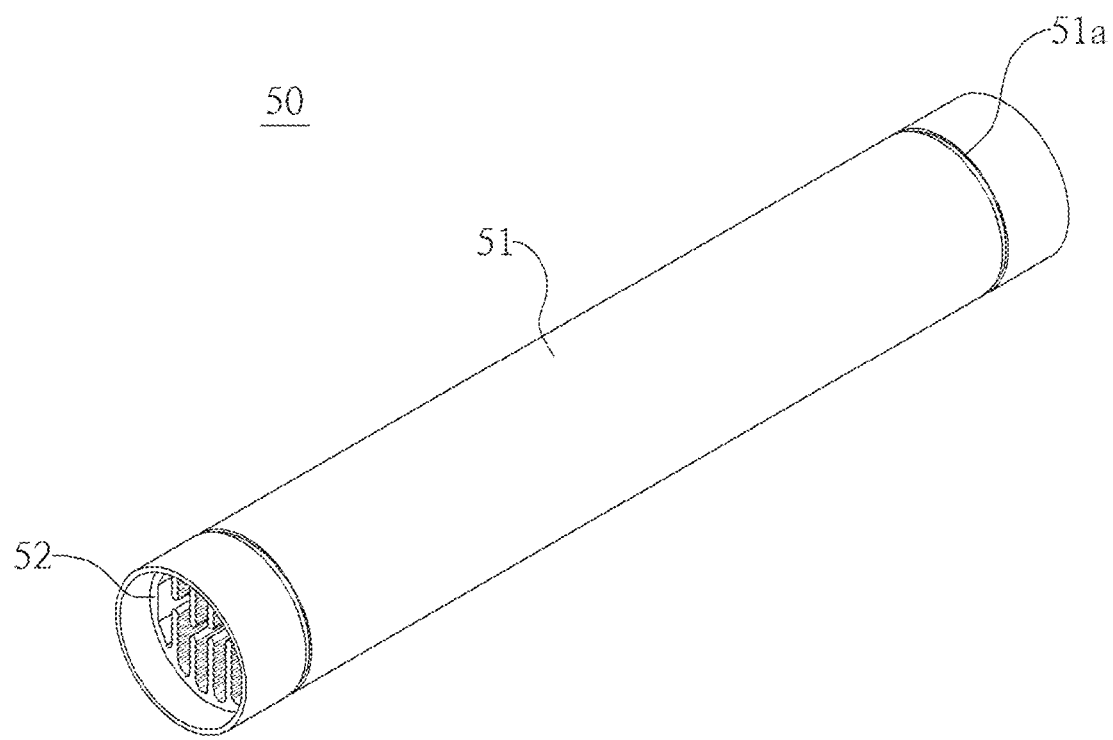
FIG. 10 is a perspective view showing a heat exchanger pipe according to a sixth embodiment of the present invention.

FIG. 10 is a perspective view showing a heat exchanger pipe according to a sixth embodiment of the present invention.

As shown in FIG. 10, a heat exchanger pipe 50 according to a sixth embodiment of the present invention includes an outer pipe 51, and, as described above, an insert 52 composed of a first half insert and a second half insert.

In particular, a locking protrusion 51a protruding inward where the insert 52 is inserted is formed at both end portions of the outer pipe 51, that is, the locking protrusions 51 are formed at portions corresponding to both longitudinal ends of the insert 52 on the outer pipe 51.

Accordingly, the insert 52 is firmly fixed without moving toward an end or the other end of the open outer pipe 51, so after the outer pipe 51 and the insert 52 are assembled by pressing the entire outer pipe 51 such that the inner circumferential surface of the outer pipe 51 and the outer circumferential surface of the insert 52 are brought in contact with each other, separation of the insert 51 from the external pipe 51 is prevented.

Hereafter, methods of manufacturing the heat exchanger pipes according to the above embodiments of the present invention are described hereafter.

FIGS. 11A to 11E are views showing a method of manufacturing the heat exchanger pipe according to the first embodiment of the present invention.

Figure 11A:
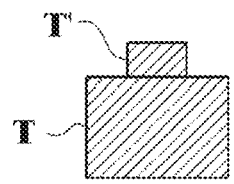
FIGS. 11A to 11E are views showing a method of manufacturing the heat exchanger pipe according to the first embodiment of the present invention.

A method of manufacturing the heat exchanger pipe according to the first embodiment of the present invention described with reference to FIG. 4 is exemplified hereafter. First, as shown in FIG. 11A, a bed T, T' is prepared to manufacture a heat exchanger pipe according to the present invention. The bed T, T' is composed of a lower bed T and an upper bed T' fixed on the lower bed T.

The upper bed T' has a size that is the same as the diameter of the assembly of the first half shell 22 and the second half shell 24, so the first half shell 22 and the second half shell 24 can be stably placed thereon. Further, the lower bed T is larger in diameter than the upper bed T', so the outer pipe 21 can be placed thereon.

Figure 11B:
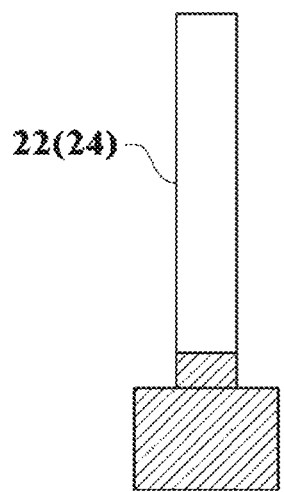

Next, as shown in FIG. 11B, the first shell 22 and the second half shell 24 combined to face each other are placed on ends on the upper bed T'. That is, the first half insert 22, 23 and the second half insert 24, 25 are prepared (insert preparation step).

Figure 11C:
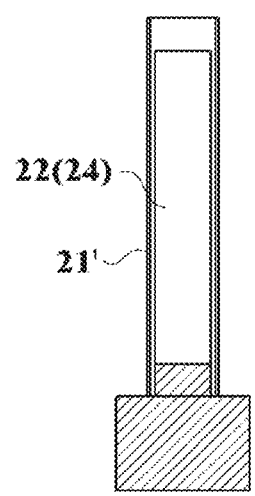

Next, as shown in FIG. 11C, a prototypal outer pipe 21' is placed on end on the lower bed such that the first half shell 22 and the second half shell 24 are positioned inside the outer pipe 21' (outer pipe preparation step). The prototypal outer pipe 21' not machined yet is larger in diameter than the assembly of the first half shell 22 and the second half shell 24, so the outer pipe can be fitted over the first half shell 22 and the second half shell 24 from above.

Figure 11D:
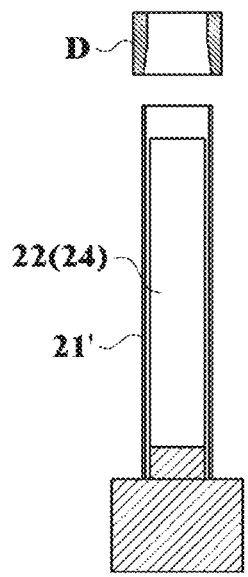

Next, as shown in FIG. 11D, a dice mold D having a tapered portion, which gradually decreases in width upward, at a lower portion therein, having a pressing portion over the tapered portion therein is prepared over the outer pipe 21 (pressing-preparation step), in which the diameter of the lower end of the tapered portion is the same as (or may be slightly larger than) the outer diameter of the outer pipe 21 and the diameter of the pressing portion is the same as (or may be slightly smaller than) the diameter of the assembly of the first half shell 22 and the second half shell 24.

Figure 11E:
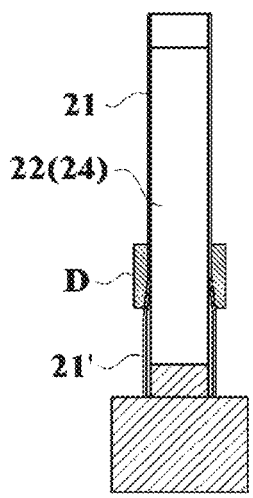

Next, as shown in FIG. 11E, the dice mold D is moved down such that the prototypal outer pipe 21' is inserted into the dice mold D, and in this state, the dice mold D is further moved down such that the pressing portion presses the prototypal outer pipe 21', whereby the inner circumferential surface of the outer pipe 21 obtained by compression of the prototypal outer pipe 21' is pressed to come in close contact with the outer surfaces of the first half shell 22 and the second half shell 24 (pressing step). Accordingly, it is possible to conveniently and simply manufacture a heat exchanger pipe.

Hereafter, a heat exchanger pipe according to a seventh embodiment of the present invention is generally described with reference to the accompanying drawings.

Figure 12:
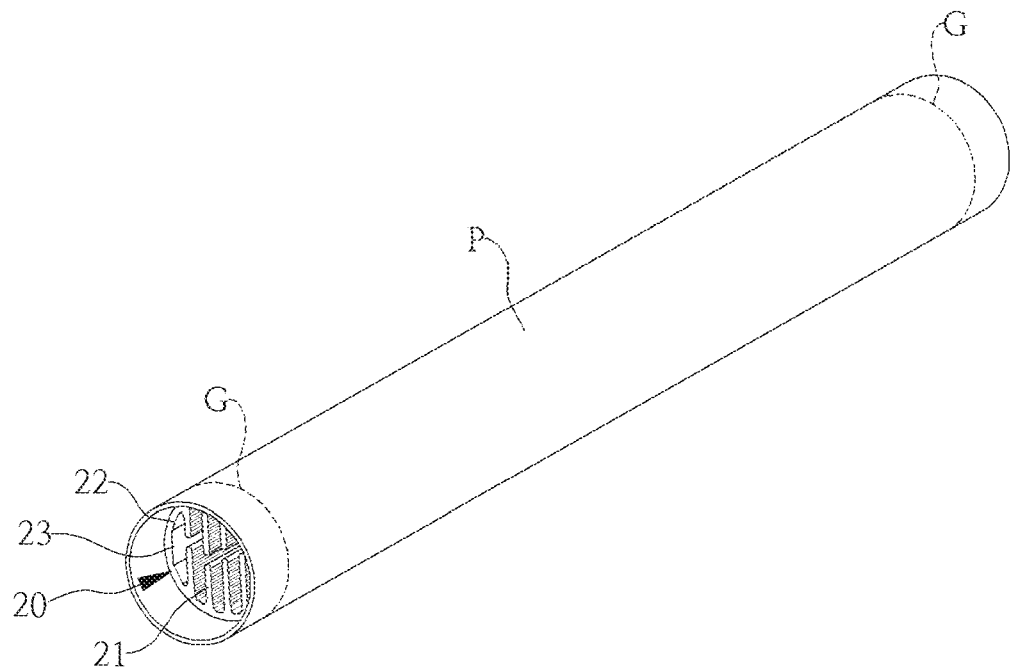
FIG. 12 is a perspective view showing a heat exchanger pipe according to a seventh embodiment of the present invention.

FIG. 12 is a perspective view showing a heat exchanger pipe according to a seventh embodiment of the present invention.

As shown in FIG. 12, a heat exchanger pipe according to the present invention includes an outer pipe P formed in a cylindrical shape and a heat exchanger fin 20 formed by integrally connecting two half shells inserted in the outer pipe P (hereafter, referred to as a 'heat exchanger fin').

The heat exchanger fin 20 and the outer pipe P are assembled such that the outer circumferential surface of the heat exchanger fin 20 and the inner surface of the outer pipe P are completely in close contact with each other. The outer pipe P is made of a metal material such as steel and the heat exchanger fin 20 is made of a metal material such as aluminum. Accordingly, heat is exchanged between first fluid flowing through the heat exchanger fin 20 and second fluid flowing on the surface of the outer pipe P.

For example, when high-temperature combustion gas produced by burning fuel with a burner (not shown) flows through the heat exchanger fin 20 and low-temperature raw water comes in contact with the surface of the outer pipe P, heat exchange occurs between the high-temperature combustion gas and the raw water. The heated raw water is used as hot water, heating water, or the like.

In the entire length of the outer pipe, a locking protrusion G protruding inward is formed at portions corresponding to both longitudinal end of the heat exchanger fin 20. Accordingly, separation of the heat exchanging fin 20 from the outer pipe P is separated. This is for preventing separation of the heat exchanger fin 20 due to vibration of its own weight in long-time use.

Figure 13A:
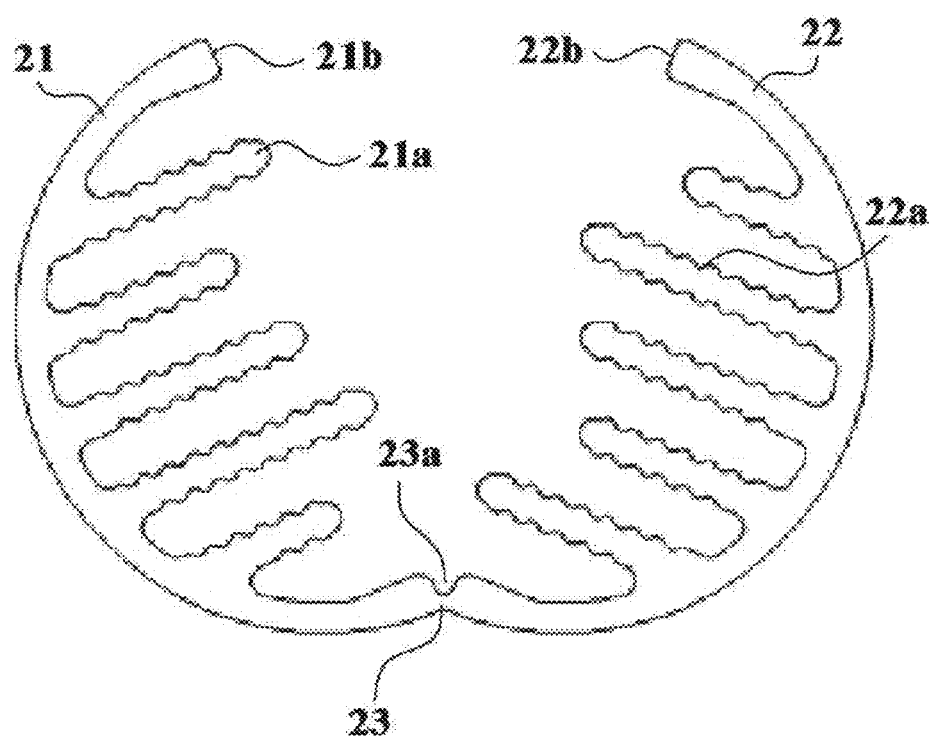
FIGS. 13A and 13B are front views showing a heat exchanger fin formed by integrally connecting two half shells for the heat exchanger pipe according to the seventh embodiment of the present invention.
Figure 13B:
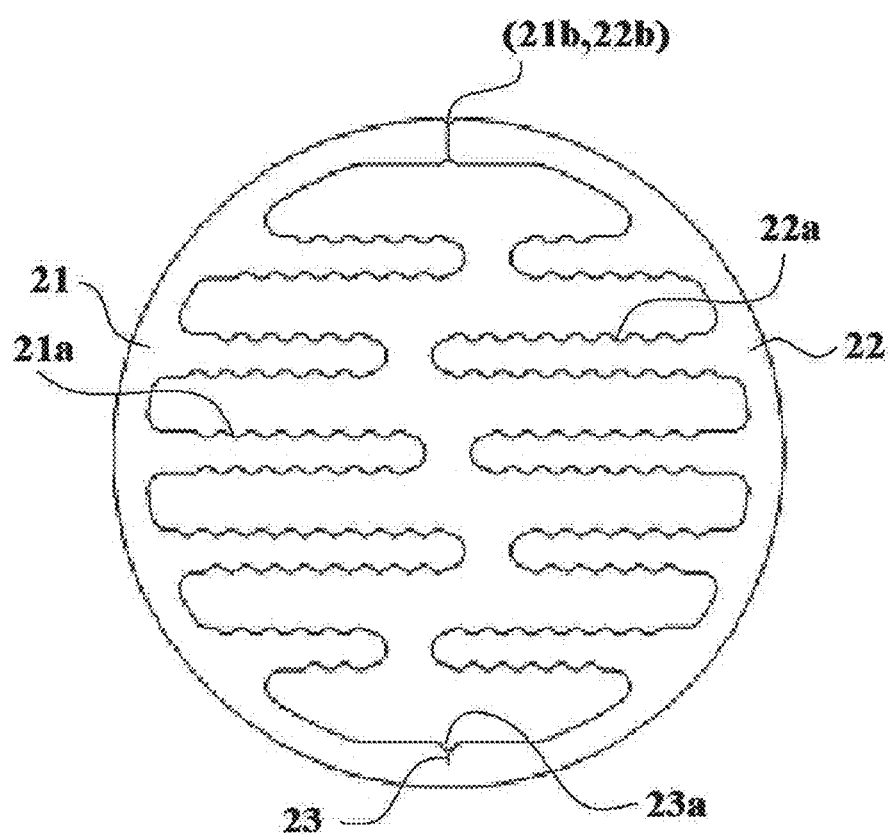

FIGS. 13A and 13B are front views showing a heat exchanger fin formed by integrally connecting two half shells for the heat exchanger pipe according to the seventh embodiment of the present invention.

As shown in FIGS. 12, 13A, and 13B, the heat exchanger fin 20 according to the present invention includes a first half shell 21 and a second half shell 22 integrally connected to the first half shell 21. First ribs 21a are formed on the inner circumferential surface of the first half shell 21 and second ribs 22a are formed on the inner circumferential surface of the second half shell 22.

The first ribs 21a are integrally formed on the inner circumferential surface of the first half shell 21 and the second ribs 22a are integrally formed on the inner circumferential surface of the second half shell 22. In particular, the first half shell 21 and the second half shell 22 are integrally formed with first ends thereof are connected to each other. As a forming method, extrusion is usually used.

The first half shell 21 and the second half shell 22 function as a body, and the first ribs 21a and the second ribs 22a are used for the purpose of increasing the heat exchange rate by increasing the surface area. In terms of the purpose, a plurality of prominences and recession is formed on the surfaces of the first ribs 21a and the second ribs 22a, thereby further increasing the surface area.

As shown in FIG. 13A, the first half shell 21 and the second half shell 22 are each formed in a semi-cylinder shape obtained by longitudinally cutting a cylinder. First ends in the circumferential direction of the first half shell 21 and the second half shell 22 are connected to each other. That is, the first half shell 21 and the second half shell 22 are integrally connected through a bridge 23.

Accordingly, as shown in FIG. 13B, when the first half shell 21 and the second half shell 22 are pivoted toward each other on the bridge 23, a cylindrical shape is formed by the first half shell 21 and the second half shell 22. Fluid such as high-temperature combustion gas flows through the cylindrical first half shell 21 and second half shell 22.

A first rib 21a extends toward the inner space from the inner circumferential surface of the first half shell 21 and a second rib 22a extends toward the inner space from the inner circumferential surface of the second half shell 22. In this case, pluralities of first ribs 21a and second ribs 22a that have fin shapes are provided to increase the heat exchange rate by increasing the surface area.

In particular, according to the present invention, a folding groove 32a is formed at the bridge 23 where the first half shell 21 and the second half shell 22 are integrally connected to each other. Accordingly, the first half shell 21 and the second half shell 22 can be easily closed, as shown in FIG. 13B, even in the state in which the first half shell 21 and the second half shell 22 are open away from each other.

The folding groove 23a, as shown in the figures, is formed in a V-shaped cross-section on the inner side of the bridge 23, so it guides the first half shell 21 and the second half shell 22 such that they can be easily closed when they are coupled to each other, and grooves having other various shapes can be used as long as the half shell can be easily closed.

It is exemplified in FIGS. 13A and 13B that second ends 21b and 22b (i.e., the ends opposite to the bridge) of the first half shell 21 and the second half shell 22 are flat. However, first prominences and recessions may be formed on the second end 21b of the first half shell 21 and second prominences and recessions may be formed on the second end 22b of the second half shell 22.

When the first prominences and recessions and the second prominences and recessions are provided, the second ends 21b and 22b of the first half shell 21 and the second half shell 22 are engaged in close contact with each other, thereby considerably reducing leakage of condensate water, etc. produced by condensation of combustion gas. The first ends of the first half shell 21 and the second half shell 22 are integrally connected to each other already in the forming process, leakage of condensate water, etc. is completely prevented.

Further, according to the present invention, the lengths of the first ribs 21a and the second ribs 22a are adjusted such that when ends of the first ribs 21a and ends of the second ribs 22a are respectively sequentially connected by virtual lines, they respectively form an S-shape. Ends, which face each other, of the first ribs 21a and the second ribs 22a are spaced part from each other not to be in contact with each other Accordingly, flow of fluid is monotonous because ribs of a heat exchanger pipe are arranged in comb shape in the related art, but the present invention further has an S-shaped passage, so fluctuation of fluid increases.

Further, the thermal contact amount of fluid such as high-temperature combustion gas with the first ribs 21a or the second ribs 22a increases, so the heat transfer amount to the outer pipe P increases. Accordingly, the heat exchange efficiency with raw water, etc. outside the outer pipe P increases.

As described above, according to the present invention, since the first half shell 21 and the second half shell 22 are connected through the bridge 23 like a single part, it is easy to form the heat exchanger pin 20 itself. This is because it is possible to manufacture the first half shell 21 and the second half shell 22 simultaneously in extrusion.

In the related art, a first half shell (1003 in FIG. 1) and a second half shell (1004 in FIG. 1) are completely separated from each other, so there is a problem that it is required to cut each of the first half shell 1003 and the second half shell 1004 one time, that is, a total of cutting twice is required. However, according to the present invention, when the heat exchanger fin 20 is manufactured with an appropriate length, it is possible to cut the first half shell 21 and the second half shell 22 simultaneously.

Figure 1:
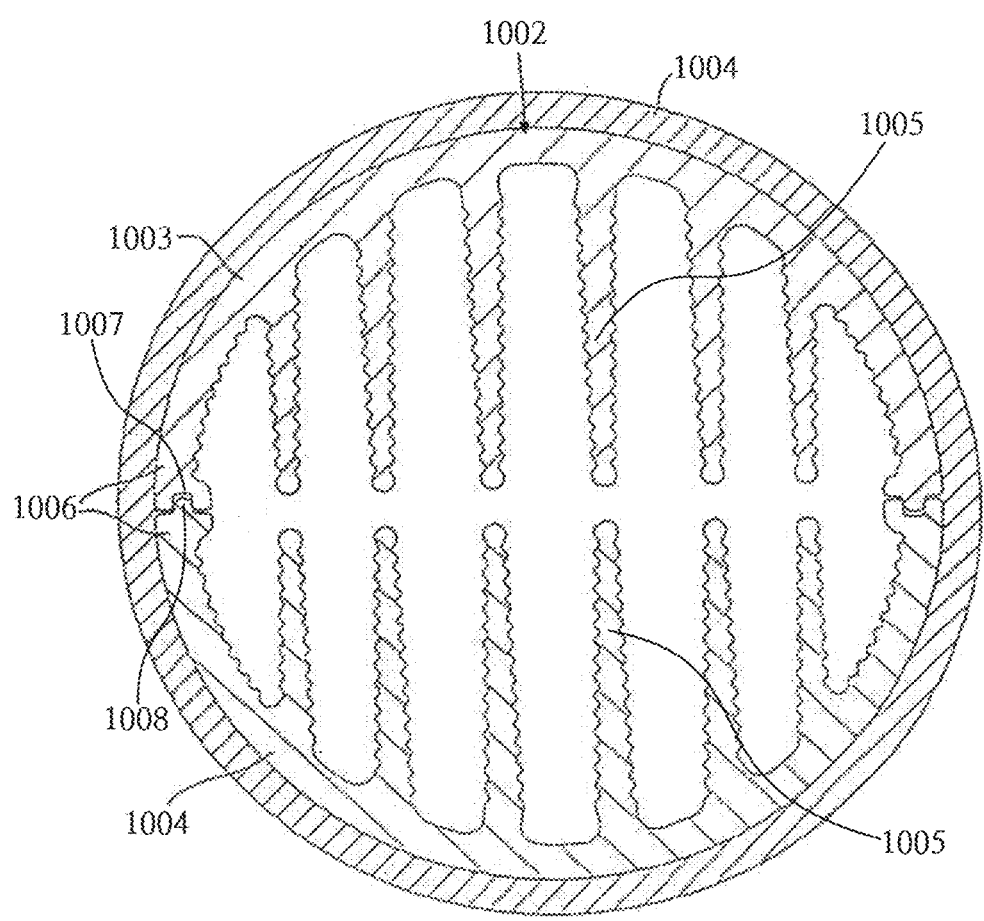
FIG. 1 is a cross-sectional view showing a heat exchanger pipe (heat exchanger tube) according to the related art.

Further, according to the present invention, since the first half shell 21 and the second half shell 22 are connected to each other, the heat exchanger fin 20 is conveniently inserted into the outer pipe P and productivity is improved. In the related art, as shown in FIG. 1, since the first half shell 21 and the second half shell 22 are separated, it is difficult to insert the half shells into the outer pipe P while holding the half shells. Further, there is problem that the first half shell 21 and the second half shell 22 fall into disorder when they are inserted.

Further, according to the present invention, since the first half shell 21 and the second half shell 22 are integrally connected through the bridge 23, condensate water does not leak to the outside at least through the bridge 23. Since condensate water is acidic, it causes environment contamination, etc. when leaking, so it is very important to prevent leakage of condensate water.

Hereafter, a method of a heat exchanger pipe according to an embodiment is described.

FIGS. 14A to 14E are views showing a method of manufacturing the heat exchanger pipe according to the seventh embodiment of the present invention.

Figure 14A:
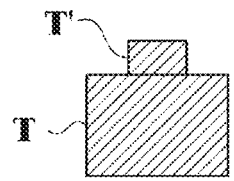
FIGS. 14A to 14E are views showing a method of manufacturing the heat exchanger pipe according to the seventh embodiment of the present invention.

First, as shown in FIG. 14A, a bed T, T' is prepared to manufacture a heat exchanger pipe according to the present invention. The bed T, T' is composed of a lower bed T and an upper bed T' fixed on the lower bed T.

The upper bed T' has the same size as the diameter of the heat exchanger fin 20 obtained by combining the first half shell 21 and the second half shell 22, so the heat exchanger fin 20 is placed on the upper bed T', and the outer pipe P is placed on the lower bed T because the lower bed T is larger in diameter than the upper bed T'.

Figure 14B:
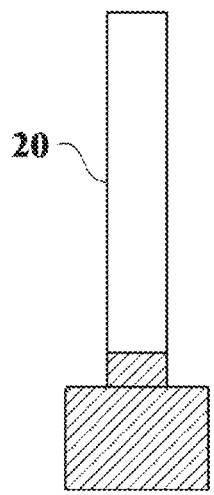

Next, as shown in FIG. 14B, the heat exchanger fin 20 is placed on the upper bed T'.

Figure 14C:
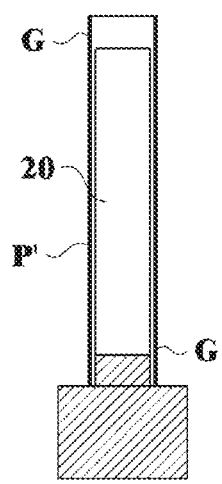

Next, as shown in FIG. 14C, a prototypal outer pipe P' is placed on end on the lower bed, whereby the heat exchanger fin 20 is disposed in the prototypal outer pipe P'. The prototypal outer pipe P' not machined yet is larger in diameter than the heat exchanger fin 20, so the prototypal outer pipe P' can be fitted over the heat exchanger fin 20 from above.

Figure 14D:
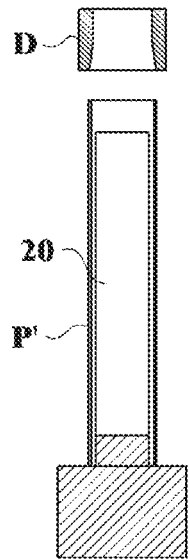

Next, as shown in FIG. 14D, a dice mold D having a tapered portion, which gradually decreases in width upward, at a lower portion therein, and having a pressing portion over the tapered portion is disposed over the outer pipe P.

Figure 14E:
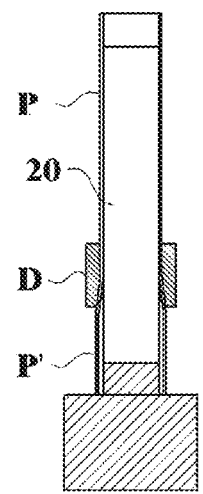

Next, as shown in FIG. 14E, the dice mold D is moved down such that the prototypal outer pipe P' is fitted in the dice mold D, and then the dice mold D is further moved down, thereby pressing the prototypal outer pipe P' with the pressing portion.

Accordingly, the inner circumferential surface of the outer pipe P formed by contraction of the prototypal outer pipe P' comes in close contact with the outer surface of the heat exchanger fin 20, so the heat exchanger fin 120, P is simply manufactured.

Hereafter, an elliptical heat exchanger pipe according to an eighth embodiment of the present invention and a hot water storage type heat exchanger having the elliptical heat exchanger pipe are described with reference to the accompanying drawings.

Figure 15:
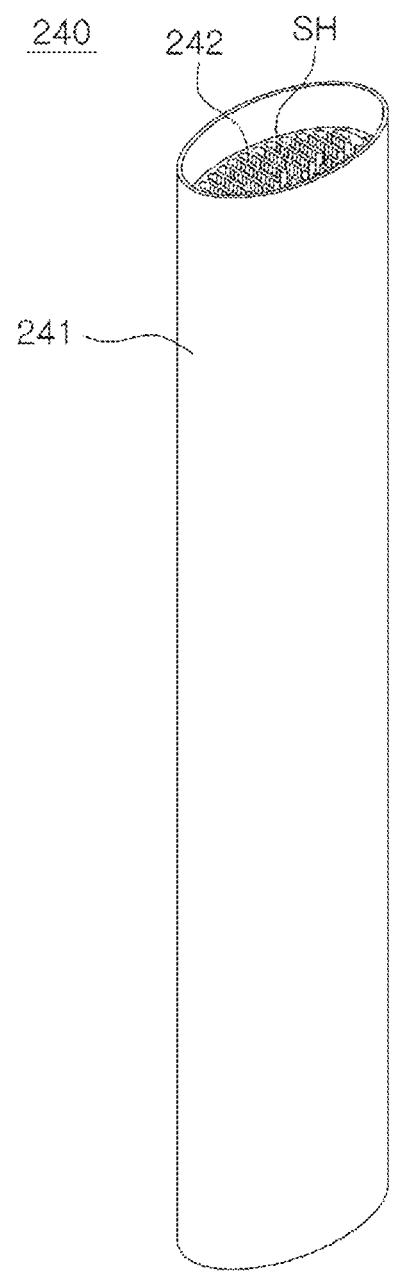
FIG. 15 is a perspective view showing an elliptical heat exchanger pipe according to an eighth embodiment of the present invention.

FIG. 15 is a perspective view showing an elliptical heat exchanger pipe according to an eighth embodiment of the present invention.

First, an elliptical heat exchanger pipe 240 according to the present invention shown in FIG. 15 is used as a component of various heating/cooling system such as a boiler, a heat pump, and an air conditioner, and has an elliptical cross-section and a predetermined length.

The elliptical heat exchanger pipe 240 enables heat exchange between fluid flowing therethrough and fluid exiting outside, thereby being able to supply not only hot water or heating water, but also hot air or cold air.

For example, the fluid flowing through the elliptical heat exchanger pipe 240 is high-temperature combustion gas produced by the burner of a boiler and the fluid existing outside the elliptical heat exchanger pipe 240 is low-temperature liquid such as raw water.

Accordingly, high-temperature combustion gas exchanges heat with raw water while flowing through the elliptical heat exchanger pipe 240, where by hot water or heating water is supplied to heating loads such as a house, a factory, an office, or the like.

To this end, the elliptical heat exchanger pipe 240 according to the present invention includes an elliptical heat exchanger tube 241 and a plurality of heat exchanger fins 242 increasing a heat transfer area and a heat exchange rate by protruding toward the empty space inside the heat exchanger tube 241.

However, a contact shell SH may be further disposed between the heat exchanger tube 241 and the heat exchanger fins 242, and in this case, the heat exchanger fins 242 protrude from the inner surface of the contact shell SH and the outer surface of the contact shell SH is in surface contact with the inner side of the heat exchanger tube 241, whereby heat transfer occurs.

The heat exchanger fins 242 are formed by drawing a metallic material (e.g., stainless steel), etc. which have high thermal conductivity, as an embodiment, and the contact shell SH may be included in drawing. The heat exchanger fins 242 manufactured in this way are inserted in the heat exchanger tube 241.

The heat exchanger tube 241 is formed in a tube shape having an elliptical cross-section and having a hollow portion so that a heat source (i.e., fluid) flows through it. A plurality of heat exchanger fins 242 protrude from the inner circumferential surface of the heat exchanger tube 241 and are provided to increase the heat exchange rate.

The reason of making the heat exchanger tube 241 in an elliptical shape in the present invention is for increasing the amount of flow of heat exchange fluid (e.g., combustion gas) by making the apsidal line of the heat exchanger tube 241 long, in which the length of the apsidal line is appropriately adjusted in accordance with heat exchange capacity.

Further, by providing a heat exchanger pipe having an elliptical cross-section, it is possible to increase the heat transfer area in comparison to other-shaped heat exchanger pipe having the same size of outer pipe (i.e., tube) and it is possible to prevent coming-off when inserting and pressing heat exchanger fins in the outer pipe.

In detail, the case of an elliptical heat exchanger pipe, as in the present invention, and the case of other-shaped heat exchanger pipe, that is, a circular or oblong heat exchanger pipe, etc. are compared hereafter.

Figure 16A:
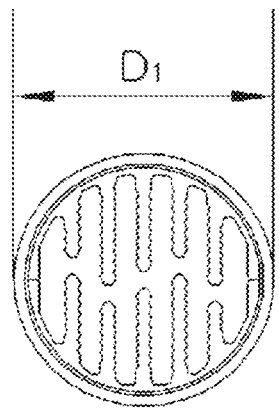
FIGS. 16A to 16C are plan views showing the elliptical heat exchanger pipe according to the eighth embodiment of the present invention and an another-shaped heat exchanger pipe.
Figure 16B:
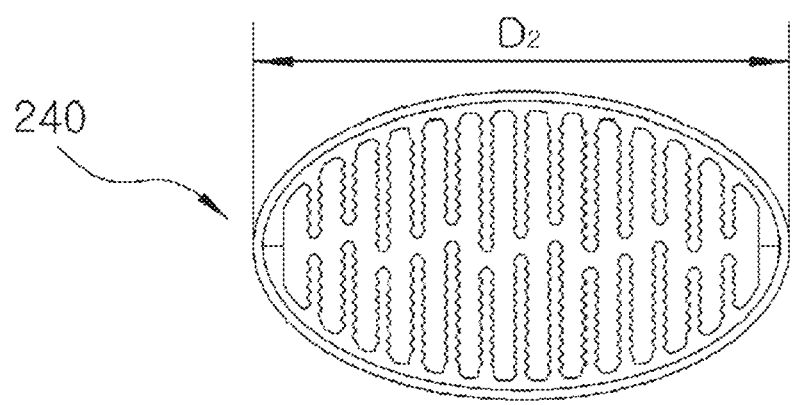
Figure 16C:
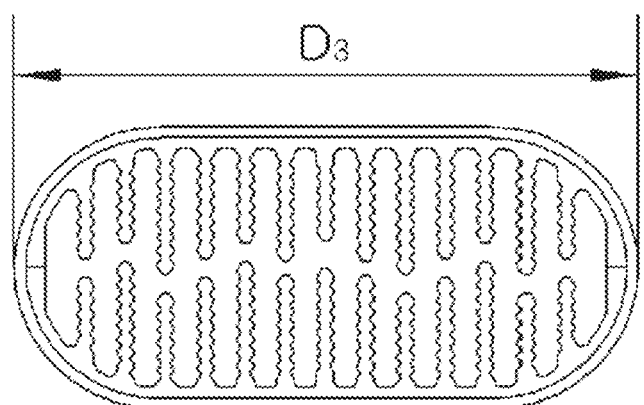

FIGS. 16A to 16C are plan views showing the elliptical heat exchanger pipe according to the eighth embodiment of the present invention and an another-shaped heat exchanger pipe.

FIG. 16A is a plan view showing a common circular heat exchanger pipe having a circular cross-section, FIG. 16B is an elliptical heat exchanger pipe 240 of the present invention, and FIG. 16C is an oblong heat exchanger pipe having an oblong cross-section.

First, the circular heat exchanger pipe shown in FIG. 16A has a very small radius of curvature, so even if the diameter is physically increased, a large number of heat exchanger fins cannot be efficiently disposed and the number of heat exchanger fins that can be received in one circular heat exchanger pipe is very small.

Further, if the lengths D2 and D3 of the apsidal lines of the elliptical heat exchanger pipe shown in FIG. 16B and the oblong heat exchanger pipe shown in FIG. 16C are the same (D2=D3), it is possible to increase the heat transfer area of the elliptical heat exchanger pipe.

That is, for example, when the width of heat exchanger fins of the elliptical heat exchanger pipe is increased, sixteen heat exchanger fins provide the same heat transfer effect as seventeen heat exchanger fins of the oblong heat exchanger pipe.

Accordingly, it can be seen that the elliptical heat exchanger pipe 240 of the present invention needs a relatively small number of heat exchanger fins to provide the same heat transfer area rather than increasing the width of the heat exchanger fins in comparison to the oblong heat exchanger pipe.

The oblong heat exchanger pipe has straight portions spaced in parallel and curved portions connecting the ends of the straight portions, and in this case, it is difficult to manufacture the oblong heat exchanger pipe because coming-off occurs between the heat exchanger fins and the straight portions when the heat exchanger fins are inserted into the oblong heat exchanger pipe and heat transfer does not normally occur if a defect is generated.

However, the elliptical heat exchanger pipe 240 of the present invention has only a round portion without a straight portion in the entire shape, coming-off described above is prevented in the manufacturing process, thereby considerably increasing the heat transfer rate (i.e., heat exchange rate).

Further, several heat exchanger fins 242 are provided in the present invention, are disposed on a line extending from a side to the other side of the inner circumferential surface of the heat exchanger tube 241, and are spaced in the direction of the apsidal line of the heat exchanger tube 241.

Figure 17A:
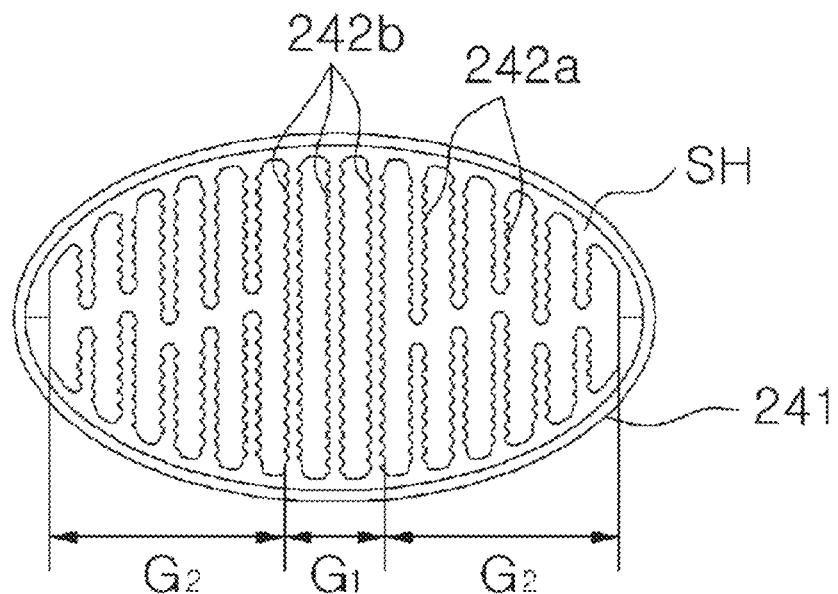
FIGS. 17A and 17B are plan views showing other examples of the heat exchanger pipe according to the eighth embodiment of the present invention.
Figure 17B:
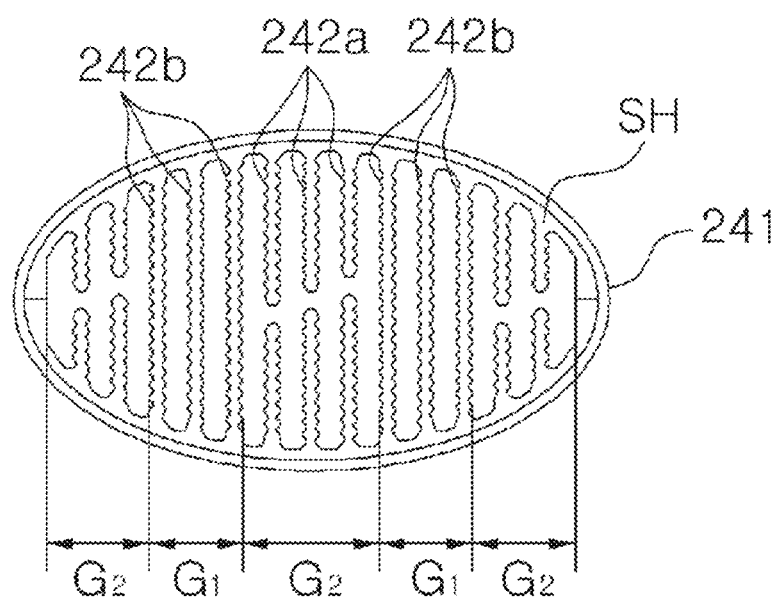

FIGS. 17A and 17B are plan views showing other examples of the heat exchanger pipe according to the eighth embodiment of the present invention.

According to another embodiment of the present invention, as shown in FIGS. 17A and 17B, some of heat exchanger fins 242 are 'discontinuous type heat exchanger fins 242a' that are disconnected at the middle portions in the longitudinal direction and the others are 'continuous type heat exchanger fins 242b' that are entirely continuous in the longitudinal direction.

Accordingly, the discontinuous type heat exchanger fins 242a increase the amount of flow of fluid such as combustion gas and fluctuates flowing fluid, thereby increasing the heat exchange rate.

On the contrary, the continuous type heat exchanger fins 242b prevent deformation of the heat exchanger tube 241, increase productivity, and provide divided exhaust loads that divide and discharge fluid. This is because the continuous type heat exchanger fins 242b provide a strong supporting force (or reinforcing force) and divide the inside of the heat exchanger tube 241.

In detail, the continuous type heat exchanger fins 242b are integrally formed (or two tub ends are bonded to each other) across the inside of the heat exchanger tube 241, they are used as reinforcing members inserted between the straight portions of the heat exchanger tube 241. Therefore, they prevent deformation of the heat exchanger tube 241.

Further, when the heat exchanger tube 241 deforms, gaps is generated between the heat exchanger fins 242 and the heat exchanger tube 241 and thermal contact is removed, this problem is solved by one design change rather than improving repeated processes or adding processes, so productivity is improved.

Further, since the inside of the heat exchanger tube 241 is divided into a plurality of sections by the continuous type heat exchanger fins 242b, one heat exchanger pipe actually provides a plurality of heat exchanger pipes and fluid such as combustion gas is separately discharged.

In particular, the heat exchanger tube 2241 may include a 'continuous fin group G1' in which one or more continuous heat exchanger fins 242b are continuously disposed.

For example, as shown in FIGS. 17A and 17B, a continuous fin group G1 composed of three continuous type heat exchanger fins 242b are continuously disposed in the heat exchanger tube 241 is provided.

Obviously, the number of the continuous type heat exchanger fins 242b included in one continuous fin group G1 may be variously adjusted, for example, as two, four, or five.

However, the larger the number of the continuous type heat exchanger fins 242b included in the continuous fin group G1, the larger the reinforcing force and the more the deformation of the heat exchanger tube 241 is prevented, but the number of the discontinuous type heat exchanger fins 242a decreases, so it is required to appropriately adjust the number of the continuous type heat exchanger fins.

Further, at least one (i.e., one or more) continuous fin group G1 is provided and may be disposed between the sections composed of discontinuous type heat exchanger fins 242a.

That is, since the inside of the heat exchanger tube 241 is divided by the continuous fin group G1, a 'discontinuous fin group G2' composed of discontinuous type heat exchanger fins 242a and another 'continuous fin group G1' may be alternately disposed.

For example, as shown in FIG. 17A, one continuous fin group G1 is disposed at the entry in the apsidal line of the heat exchanger tube 241, discontinuous type heat exchanger fins 242a are disposed in each of the left and right sections divided by the continuous fin group.

When two continuous fin groups G1 are provided, a discontinuous type heat exchanger fin 242a is disposed in each of the section between the two spaced continuous fin groups G1 and the sections outside the continuous fin groups G1, so more continuous fin groups G1 can be provided in this way.

However, the number and lengths of discontinuous type heat exchanger fins 242a sequentially disposed in the section divided by the continuous fin group G1 may be adjusted such that the ends of the discontinuous type heat exchanger fins 242a make an S-shape when they are sequentially connected by a virtual line.

The S-shape may be formed by one discontinuous fin group G2 or adjacent or spaced several discontinuous fin groups G2.

Accordingly, fluid fluctuates in an S-shape in the sections in which the separate type heat exchanger fins 242a are disposed, so the heat exchange rate further increases.

A hot water storage type heat exchanger having an elliptical heat exchanger pipe having the above configuration according to an embodiment of the present invention is described hereafter.

Figure 18:
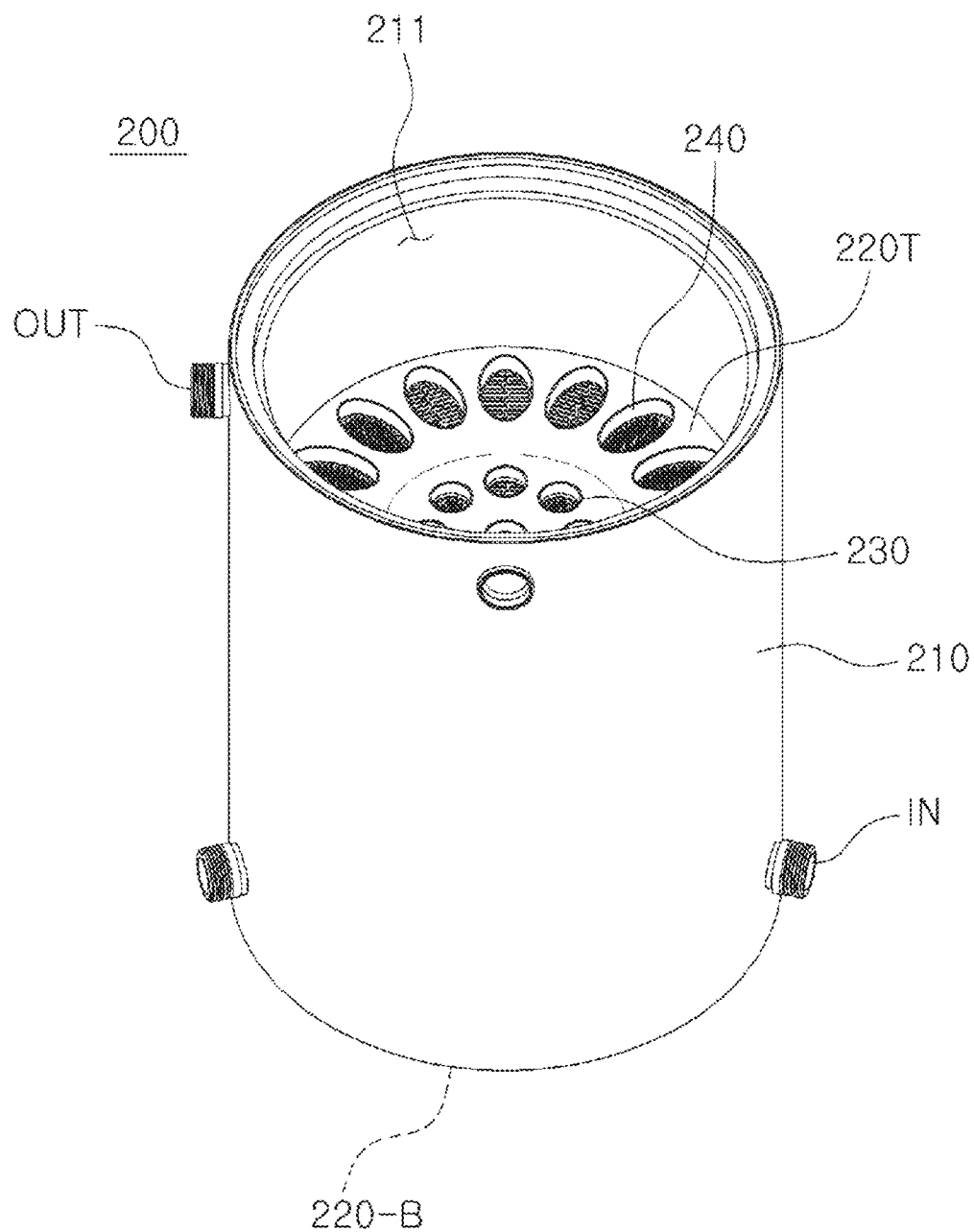
FIG. 18 is a perspective view showing a hot water storage type heat exchanger having the elliptical heat exchanger pipe according to the eighth embodiment of the present invention.

FIG. 18 is a perspective view showing a hot water storage type heat exchanger having the elliptical heat exchanger pipe according to the eighth embodiment of the present invention.

As shown in FIG. 18, a hot water storage type heat exchanger 200 having an elliptical heat exchanger pipe according to the present invention includes a heat exchanger body 210 having a water storage space therein.

The heat exchanger body 210 has an inlet IN at a lower portion through which low-temperature raw water (or preheated water) flows inside and an outlet OUT at an upper portion through which hot water or heating water heated through heat exchange is discharged.

A downward type burner (see 2151 in FIG. 2) is disposed on the heat exchanger body 210 and a predetermined space defined inside the upper portion of the heat exchanger body 210 is used as a combustion chamber 211 into which a flame and combustion gas are spouted.

A top end plate 220-T, a bottom end plate 220-B, a circular heat exchanger pipe 230, and an elliptical heat exchanger pipe 240 are disposed in the heat exchanger body 210.

The top end plate 220-T and the end plate 220-B are spaced up and down a predetermined distance apart from each other in the heat exchanger body 210, and the circular exchanger pipe 230 and the elliptical heat exchanger pipe 240 are vertically fitted between the plates.

The hot water storage type heat exchanger having this configuration according to the present invention enables heat exchange between combustion gas in the heat exchanger body 210 and raw water outside the body, and the raw water heated by heat exchange is supplied as hot water or heating water.

Figure 3:
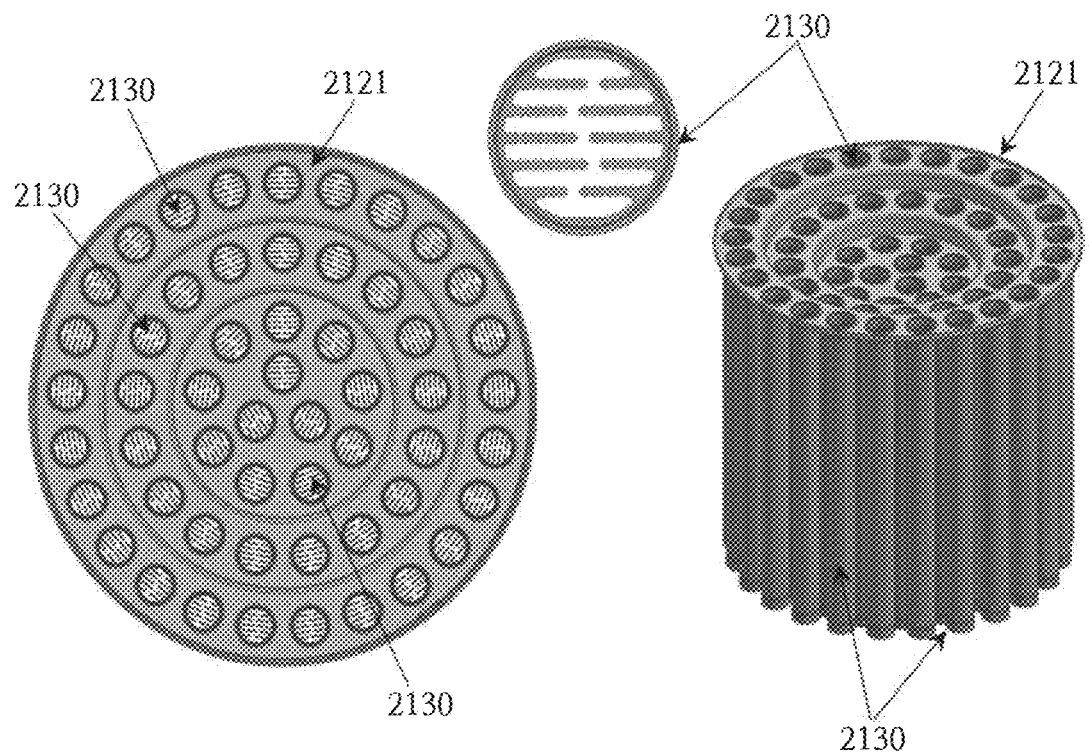
FIG. 3 is a view showing the hot water storage type boiler according to the related art.

To this end, the combustion chamber 211 over the top end plate 220-T is exposed to a burner 2151 in FIG. 3 and the bottom end plate 220-B is connected to the exhaust port 2140 in FIG. 3, so high-temperature combustion gas produced in the burner is discharged outside through the heat exchanger pipes 230 and 240.

Figure 19:
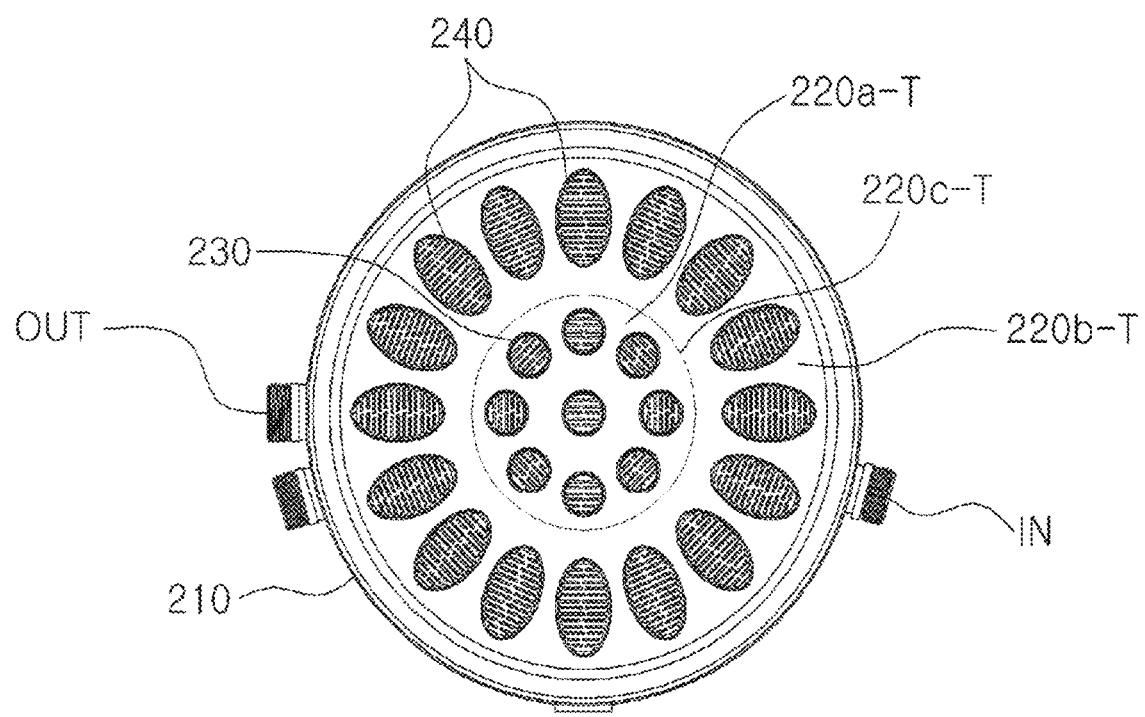
FIG. 19 is a plan view showing the hot water storage type heat exchanger having the elliptical heat exchanger pipe according to the eighth embodiment of the present invention.

FIG. 19 is a plan view showing the hot water storage type heat exchanger having the elliptical heat exchanger pipe according to the eighth embodiment of the present invention.

As shown in FIGS. 18 and 19, the top end plate 220-T has a disc shape and has a first top stage 220a-T at the center and a second top stage 220b-T around (i.e., outside) the first top stage 220a-T.

A plurality of circular fitting-holes is formed through the first top stage 220a-T to fit the heat exchanger pipes 230 and elliptical fitting-holes are formed through the second top stage 220b-T to fit the elliptical heat exchanger pipe 240.

Similarly, the bottom end plate 220-B also has disc shape and has a first bottom stage at the center and a second bottom stage around (i.e., outside) the first bottom stage.

The bottom end plate 220-B is disposed at the lower end of the heat exchanger body 210 and is spaced in parallel downward from the top end plate 220-T. Accordingly, a water chamber is defined in the space surrounded by the top end plate 220-T, the bottom end plate 220-B, and the heat exchanger body 210 and the heat exchanger pipes 230 and 240 are disposed in the water chamber.

In the bottom end plate 220-B, similar to the top end plate 220-T, circular fitting-holes in which a plurality of circular heat exchanger pipes 230 is fitted are formed through the first bottom stage and elliptical fitting-holes in which a plurality of elliptical heat exchanger pipes 240 is fitted are formed through the second bottom stage.

The upper and lower open ends of the circular heat exchanger pipe 230 are connected to the top end plate 220-T and the bottom end plate 220-B, respectively. Since the circular heat exchanger pipes 230 are circular pipes having a circular cross-section, so they are fitted in the circular fitting-holes of the top end plate 220-T and the bottom end plate 220-B.

In particular, the circular heat exchanger pipes 230 are disposed at the center portions of the top and bottom end plates 220-T and 220-B. That is, the upper ends of the circular heat exchanger pipes 230 pass through the first top stage 220a-T of the top end plate 220-T and the lower ends pass through the first bottom stage of the bottom end plate 220-B.

Heat exchanger fins are disposed in the circular heat exchanger pipe 230, similar to the elliptical heat exchanger pipe 240 described above. The heat exchanger fins increase a heat transfer amount by increasing the contact surface area with combustion gas.

The upper and lower open ends of the elliptical heat exchanger pipe 240 are connected to the top end plate 220-T and the bottom end plate 220-B, respectively. Since the elliptical heat exchanger pipes 240 are elliptical pipes having an elliptical cross-section, so they are fitted in the elliptical fitting-holes of the top end plate 220-T and the bottom end plate 220-B.

In particular, the circular heat exchanger pipes 240 are disposed at the outer portion between the top and bottom end plates 220-T and 220-B. That is, the upper ends of the elliptical heat exchanger pipes 240 pass through the second top stage 220b-T of the top end plate 220-T and the lower ends pass through the second bottom stage of the bottom end plate 220-B.

Further, as described with reference to FIGS. 15, 16, etc., the heat exchanger fins 242 are inserted in the elliptical heat exchanger pipe 240, thereby increasing the contact surface are with combustion gas and the heat transfer amount.

Since the long radius of the elliptical heat exchanger pipe 240 is two times larger or more than the radius of the circular heat exchanger pipe 230, the heat transfer area is considerably wide, and short radius of the elliptical heat exchanger pipe 240 is also larger than the radius of the elliptical heat exchanger 240.

Accordingly, the elliptical heat exchangers 240 are disposed outside (i.e., in the second state of) the end plate having a large circumference and the circular heat exchanger pipes 230 are disposed at the center (i.e., in the first stage) of the end plate having a small circumference.

Accordingly, the heat transfer area by the entire heat exchanger pipes 220 and 230 to the outer diameter of the entire hot water storage type heat exchanger is considerably increased by the elliptical heat exchangers 240, and a relatively small number of heat exchanger pipes are used to provide the same thermal efficiency, whereby it is possible to reduce the size of the hot water storage type heat exchanger.

Further, a plurality of elliptical heat exchanger pipes 240 is circumferentially arranged along the second top stage 220b-T and the second bottom stage.

Accordingly, the ratio of the entire cross-sectional area of the elliptical heat exchanger pipes 240 to the entire area of the second top stage 220b-T (or the second bottom stage) is very large.

That is, density of the elliptical heat exchanger pipes 240 increases, so the heat transfer area further increases and the heat exchange rate further increases.

Further, the top end plate 220-T of the present invention may be a multi-stage top end plate 220-T of which the second top stage 220b-T is higher than the first top stage 220a-T.

Accordingly, when a heat source (e.g., flame and combustion gas) produced by the burner is circumferentially spouted, the distances to the first top stage 220a-T and the second top stage 220b-T are uniform.

Therefore, concentration of heat transfer at a specific portion in the water chamber in the heat exchanger body 210 is prevented, so low-temperature raw water is uniformly heated.

The interface 220c-T between the first top stage 220a-T and the second top stage 220b-T of the multi-stage top end plate 220-T is sloped (indicated by a dotted line).

The sloped interface 220c-T enables smooth flow of fluid such as combustion gas, so combustion gas increases thermal efficiency while they are guided to the circular heat exchanger pipes 230 and the elliptical heat exchanger pipes 240.

The bottom end plate 220-B of the present invention is also a multi-stage bottom end plate 220-B of which the second bottom stage is higher than the first bottom stage and the multi-stage bottom end plate 220-B has the same steps as the multi-stage top end plate 220-T.

Figure 20:
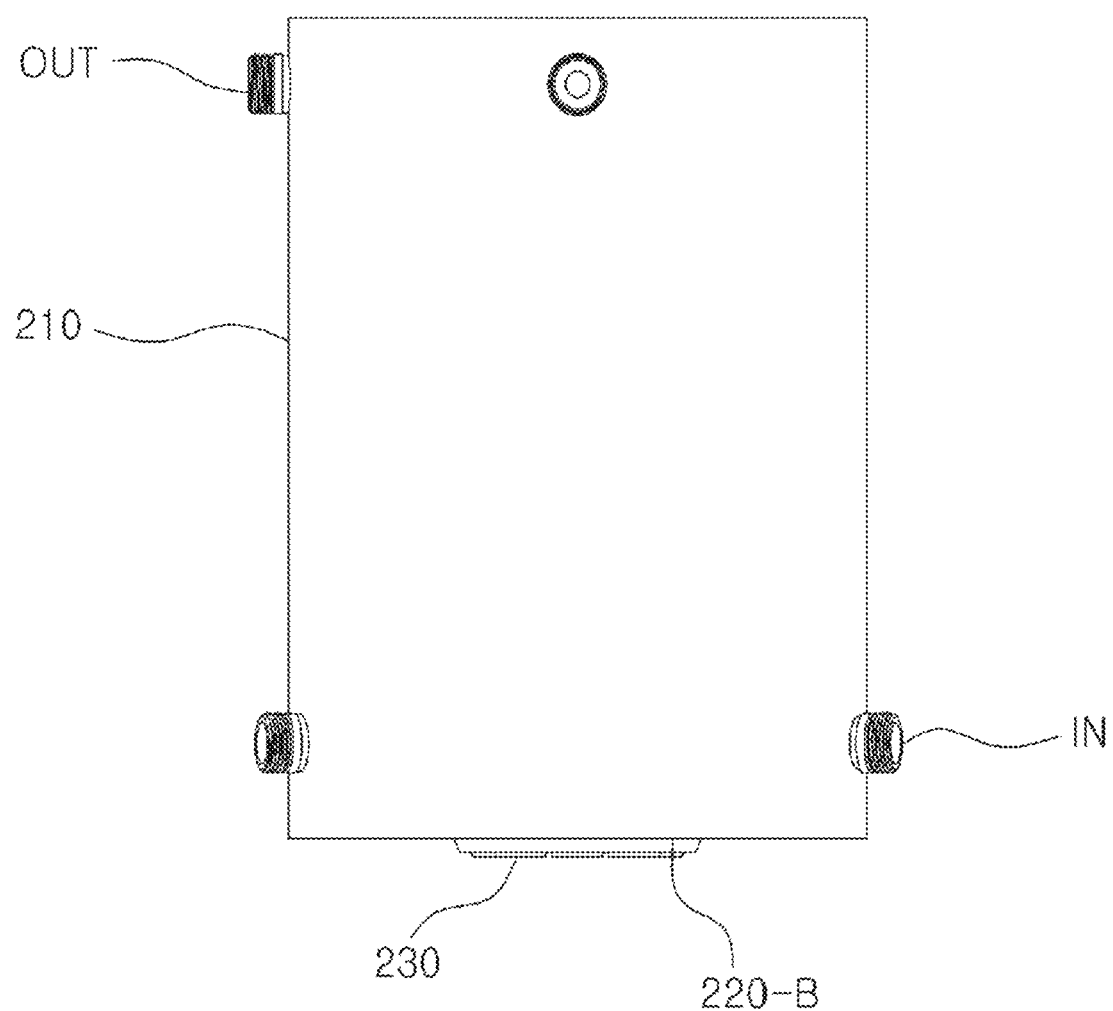
FIG. 20 is a front view showing the hot water storage type heat exchanger having the elliptical heat exchanger pipe according to the eighth embodiment of the present invention.

FIG. 20 is a front view showing the hot water storage type heat exchanger having the elliptical heat exchanger pipe according to the eighth embodiment of the present invention.

Since the first bottom stage at the center of the bottom end plate 220-B is lower than the second bottom stage disposed around the first bottom stage, only the first bottom stage is shown when seen from the front, as shown in FIG. 20.

Accordingly, since the circular heat exchanger pipes 230 and the elliptical heat exchanger pipes 240 are the same in length, the distances that the combustion gas flows through the circular heat exchanger pipes 230 and the elliptical heat exchanger pipes 240 are the same, so it uniformly transmits heat to the entire inside of the water tank 1120.

Specific embodiments of the present invention were described above. However, it would be understood by those skilled in the art that the spirit and scope of the present invention are not limited to the specific embodiments and the present invention may be modified in various ways without departing from the spirit of the present invention. Therefore, the embodiments described above are provided to completely let those skilled in the art of the scope of the present invention, so the embodiments should be understood as only example not limiting the present invention and the present invention is defined only by the range of claims.

What is claimed is:

1. A method of manufacturing a heat exchanger pipe, the method comprising:
 an insert preparation process of placing a contact shell on an upper bed;
 an outer pipe preparation process of placing the outer pipe on a lower bed to insert the contact shell into the outer pipe;
 a pressing-preparation process of disposing a dice mold having a tapered portion and a pressing portion over the outer pipe; and
 a pressing process of pressing the outer pipe with the pressing portion so that the inner circumferential surface of the outer pipe comes in direct surface-to-surface contact with the outer circumferential surface of the contact shell,
 wherein a plurality of heat exchanger fins are protrudingly formed on the inner circumferential surface of the contact shell,
 wherein the heat exchanger fins comprise at least one first fin group and at least one second fin group,
 wherein the first fin group comprises a plurality of first heat exchanger fins, which are discontinuous type heat exchanger fins that are disconnected at middle portions in a longitudinal direction thereof and consecutively positioned,
 wherein the second fin group comprises a plurality of second heat exchanger fins, which are continuous type heat exchanger fins that are entirely continuous in a longitudinal direction thereof and consecutively positioned,
 wherein the first fin group and the second fin group are alternately disposed, and
 wherein the second fin group is composed of three continuous type heat exchanger fins disposed continuously.

* * * * *